United States Patent
Hannuksela et al.

(10) Patent No.: US 11,457,244 B2
(45) Date of Patent: Sep. 27, 2022

(54) APPARATUS, A METHOD AND A COMPUTER PROGRAM FOR VIDEO CODING AND DECODING

(71) Applicant: Nokia Technologies Oy, Espoo (FI)

(72) Inventors: Miska Hannuksela, Tampere (FI); Jani Lainema, Tampere (FI); Francesco Cricri, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/043,925

(22) PCT Filed: Mar. 29, 2019

(86) PCT No.: PCT/FI2019/050256
§ 371 (c)(1),
(2) Date: Sep. 30, 2020

(87) PCT Pub. No.: WO2019/197712
PCT Pub. Date: Oct. 17, 2019

(65) Prior Publication Data
US 2021/0127140 A1   Apr. 29, 2021

(30) Foreign Application Priority Data

Apr. 9, 2018   (FI) ..................... 20185333

(51) Int. Cl.
*H04N 7/12* (2006.01)
*H04N 19/85* (2014.01)
(Continued)

(52) U.S. Cl.
CPC ............... *H04N 19/85* (2014.11); *G06N 3/08* (2013.01); *H04N 19/124* (2014.11); *H04N 19/172* (2014.11); *H04N 19/176* (2014.11)

(58) Field of Classification Search
CPC .... H04N 19/85; H04N 19/124; H04N 19/172; H04N 19/176; H04N 19/59;
(Continued)

(56) References Cited

U.S. PATENT DOCUMENTS 7,454,388 B2 * 11/2008 Thaler .................. G06K 9/6256
706/25
9,015,093 B1 * 4/2015 Commons .......... G01C 21/3602
706/26
(Continued)

FOREIGN PATENT DOCUMENTS

WO   2017/178782 A1   10/2017
WO   2019/115865 A1    6/2019

OTHER PUBLICATIONS

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
(Continued)

*Primary Examiner* — Gims S Philippe
(74) *Attorney, Agent, or Firm* — Joseph C. Drish; Harrington & Smith

(57) ABSTRACT

A method comprising: obtaining a block of a picture or a picture in an encoder; determining if the block/picture is used for on-line learning; if affirmative, encoding the block/picture; reconstructing a coarse version of the block/picture or the respective prediction error block/picture; enhancing the coarse version using a neural net; fine-tuning the neural net with a training signal based on the coarse version; determining if the block/picture is enhanced using the neural net; and if affirmative, encoding the block/picture with enhancing using the neural net.

27 Claims, 17 Drawing Sheets

(51) Int. Cl.
*H04N 19/124* (2014.01)
*H04N 19/172* (2014.01)
*H04N 19/176* (2014.01)
*G06N 3/08* (2006.01)

(58) Field of Classification Search
CPC ........ H04N 19/395; G06N 3/08; G06N 3/088;
G06N 3/0481; G06N 5/003; G06N 3/063;
G06N 3/084; G06N 3/0454
USPC ...................................................... 375/240.03
See application file for complete search history.

(56) References Cited

U.S. PATENT DOCUMENTS

| | | | |
|---|---|---|---|
| 9,220,634 B2* | 12/2015 | Nirenberg | A61N 1/36046 |
| 10,853,738 B1* | 12/2020 | Dockendorf | G06N 3/088 |
| 2009/0067491 A1 | 3/2009 | Sun et al. | |
| 2011/0090950 A1 | 4/2011 | Bush et al. | |
| 2016/0328644 A1* | 11/2016 | Lin | G06N 3/084 |
| 2017/0347110 A1 | 11/2017 | Wang et al. | |
| 2018/0359416 A1* | 12/2018 | Hold-Geoffroy | G06N 3/0454 |
| 2018/0367192 A1* | 12/2018 | O'Shea | H04B 7/0413 |
| 2019/0042952 A1* | 2/2019 | Jia | G06K 9/00302 |
| 2019/0236817 A1* | 8/2019 | Cheng | G01R 33/5611 |
| 2019/0307427 A1* | 10/2019 | Levy | A61B 8/5246 |
| 2020/0110930 A1* | 4/2020 | Simantov | G06N 20/00 |
| 2020/0111238 A1* | 4/2020 | Covell | G06N 3/0454 |
| 2020/0355774 A1* | 11/2020 | Wang | G01R 33/0029 |

OTHER PUBLICATIONS

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"Information technology—Generic coding of moving pictures and associated audio information: Systems", ISO/IEC 13818-1, Second Edition, Dec. 1, 2000, 174 pages.

"Information technology Coding of audiovisual objects—Part 12: ISO base media file format", ISO/IEC 14496-12, Fifth Edition, Dec. 15, 2015, 248 pages.

Information technology—Coding of audio visual objects—Part 15: Carriage of network abstraction layer (NAL) unit structured video in the ISO base media file format, ISO/IEC FDIS 14496-15:2014(E), Fifth Edition, Jan. 13, 2014, 182 pages.

"High Efficiency Video Coding", Series H: Audiovisual And Multimedia Systems, Infrastructure of audiovisual services—Coding of moving video, Recommendation ITU-T H.265, Dec. 2016, 664 pages.

Parameter Values For Ultra-High Definition Television Systems For Production And International Programme Exchange, Recommendation ITU-R BT.2020, Aug. 2012, 7 pages.

"Parameter Values for the HDTV Standards for Production and International Programme Exchange", Recommendation ITU-R BT.709-6, Jun. 2015, 19 pages.

Office action received for corresponding Finnish Patent Application No. 20185333, dated Jan. 24, 2019, 8 pages.

Zhang et al., "Reducing Blocking Artifacts in JPEG Compressed Images using an Adaptive Neural Network-Based Algorithm", Neural Computing and Applications, vol. 22, 2013, pp. 3-10.

Hou et al., "Deep Feature Consistent Deep Image Transformations: Downscaling, Decolorization and HDR Tone Mapping", arXiv, Sep. 11, 2017, pp. 1-12.

International Search Report and Written Opinion received for corresponding Patent Cooperation Treaty Application No. PCT/FI2019/050256, dated Jun. 28, 2019, 18 pages.

* cited by examiner

APPARATUS, A METHOD AND A COMPUTER PROGRAM FOR VIDEO CODING AND DECODING

RELATED APPLICATION

This application claims priority to PCT Application No. PCT/FI2019/050256, filed on Mar. 29, 2019, which claims priority to Finnish Application No. 20185333, filed on Apr. 9, 2018, each of which is incorporated herein by reference in its entirety.

TECHNICAL FIELD

The present invention relates to an apparatus, a method and a computer program for video coding and decoding.

BACKGROUND

Recently, the development of various neural network (NN) techniques, especially the ones related to deep learning, has enabled to learn algorithms for several tasks from the raw data, which algorithms may outperform algorithms which have been developed for many years using traditional (non-learning based) methods.

Some neural net approaches have been developed for implementing video/image video coding tools through deep learning. For example, a NN-based intra prediction has been introduced, where a prediction block is generated from neighboring decoded blocks used a neural net. In block-wise reduced resolution coding with neural net-based upsampling, an image block is adaptively encoded either with full spatial resolution or reduced spatial resolution, and a reconstructed reduced resolution block is upsampled to full resolution possibly using a NN-based upsampler.

However, these neural net approaches are focused on enhancing the encoding through improving the operation of the coding tools with a pre-defined neural net. On-line learning approaches for using neural net based video signal enhancement have not been utilized.

SUMMARY

Now in order to at least alleviate the above problems, an enhanced encoding method is introduced herein.

A method according to a first aspect comprises obtaining a block of a picture or a picture in an encoder; determining if the block/picture is used for on-line learning; if affirmative, encoding the block/picture; reconstructing a coarse version of the block/picture or the respective prediction error block/picture; enhancing the coarse version using a neural net; fine-tuning the neural net with a training signal based on the coarse version; determining if the block/picture is enhanced using the neural net; and if affirmative, encoding the block/picture with enhancing using the neural net.

A method according to a second aspect comprises obtaining an encoded block of a picture or an encoded picture in a decoder; determining if the block/picture is used for on-line learning; if affirmative, decoding the block/picture; reconstructing a coarse version of the block/picture or the respective prediction error block/picture; enhancing the coarse version using a neural net; fine-tuning the neural net with a training signal based on the coarse version; determining if the block/picture is enhanced using the neural net; and if affirmative, decoding the block/picture with enhancing using the neural net.

According to an embodiment, the method further comprises reconstructing the block/picture or the respective prediction error block/picture; and fine-tuning the neural net with the training signal based on the reconstructed block/picture or the respective reconstructed prediction error block/picture and on the coarse version.

According to an embodiment, the block/picture is determined to be used for on-line learning based on one or more of the following:
a quantization parameter value;
block/picture type(s);
block/picture prediction type(s);
sub-layer identifier associated with the block/picture.

According to an embodiment, the block/picture is determined to be enhanced using the neural net when the block/picture is not used for on-line learning.

According to an embodiment, the method further comprises indicating, in or along the bitstream, which blocks or pictures are used as sources for on-line learning.

According to an embodiment, said reconstructing the coarse version comprises: requantizing reconstructed transform coefficients of the prediction error block/picture; and reconstructing the respective coarse prediction error block/picture.

According to an embodiment, the method further comprises deriving the training signal from a gradient of a loss, where the loss is represented by:
a difference of a reconstructed prediction error and a neural net (NN) enhanced reconstructed prediction error, where the enhancement is applied to a coarser-quantized reconstructed prediction error; or
a difference of the reconstructed reference block/picture and a NN-enhanced reconstructed reference block/picture, where the enhancement is applied to a coarser-quantized reconstructed prediction error.

According to an embodiment, the method further comprises using the neural net for enhancing the reconstructed prediction error block/picture prior to reconstructing the block/picture by essentially summing up the respective prediction block/picture and the respective prediction error.

Apparatuses according to a third and a fourth aspect comprise at least one processor and at least one memory, said at least one memory stored with code thereon, the at least one memory and the computer program code configured to, with the at least one processor, cause the apparatus to perform the method.

According to a further aspect, there is provided a computer readable non-transitory storage medium stored with code thereon for use by an apparatus, which when executed by a processor, causes the apparatus to perform the method.

The apparatuses and the computer readable storage mediums stored with code thereon, as described above, are thus arranged to carry out the above methods and one or more of the embodiments related thereto.

Further aspects relate to apparatuses comprising means for performing the above methods and one or more of the embodiments related thereto.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
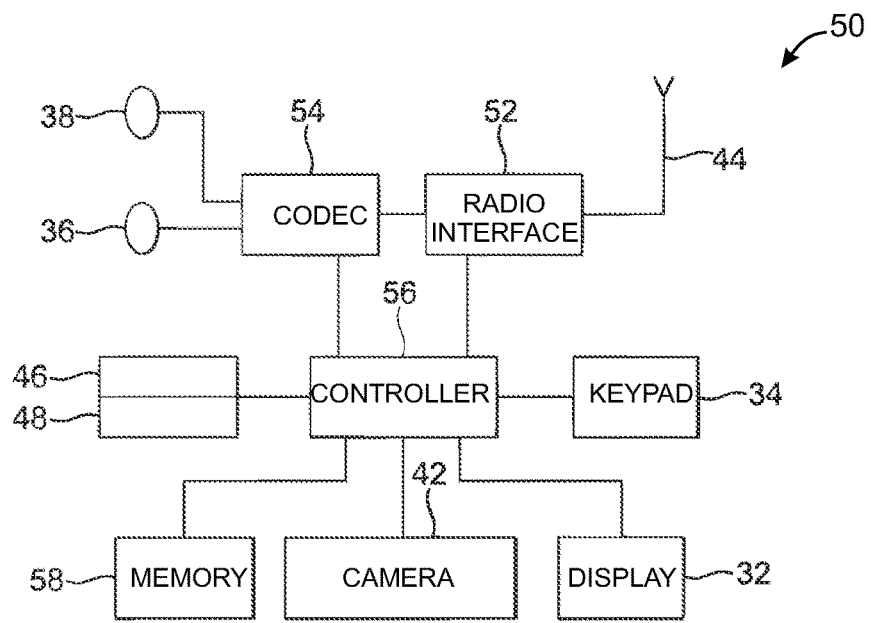
FIG. 1 shows schematically an electronic device employing embodiments of the invention.
Figure 2:
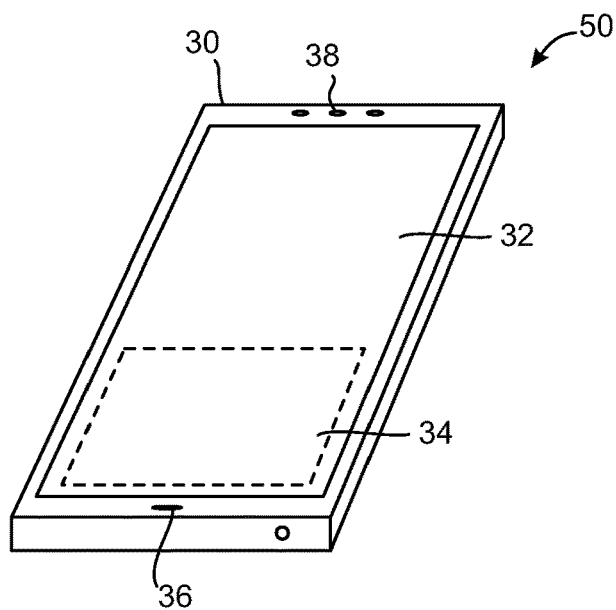
FIG. 2 shows schematically a user equipment suitable for employing embodiments of the invention.

The following describes in further detail suitable apparatus and possible mechanisms for neural-net based video/image encoding. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
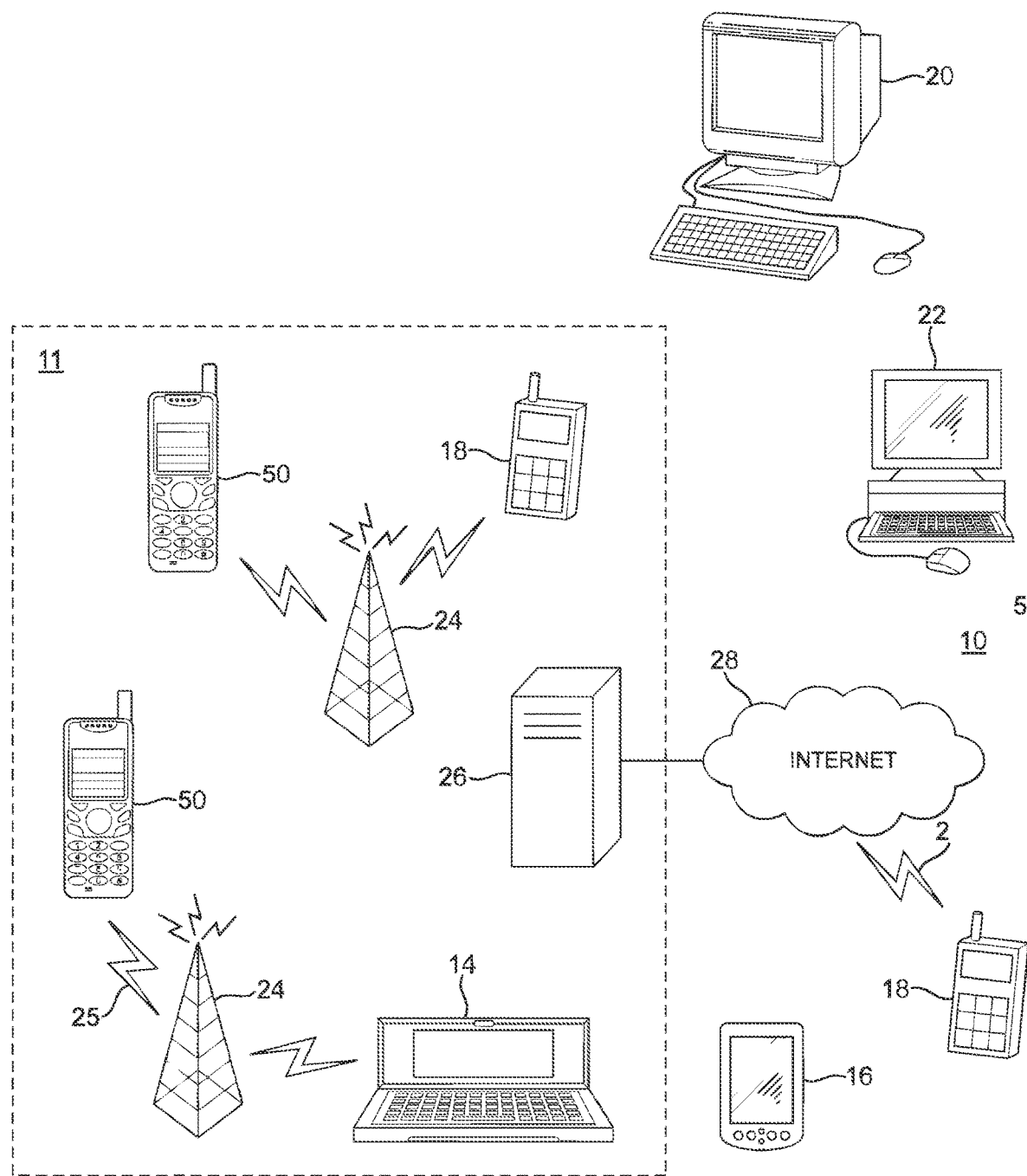
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form.

A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
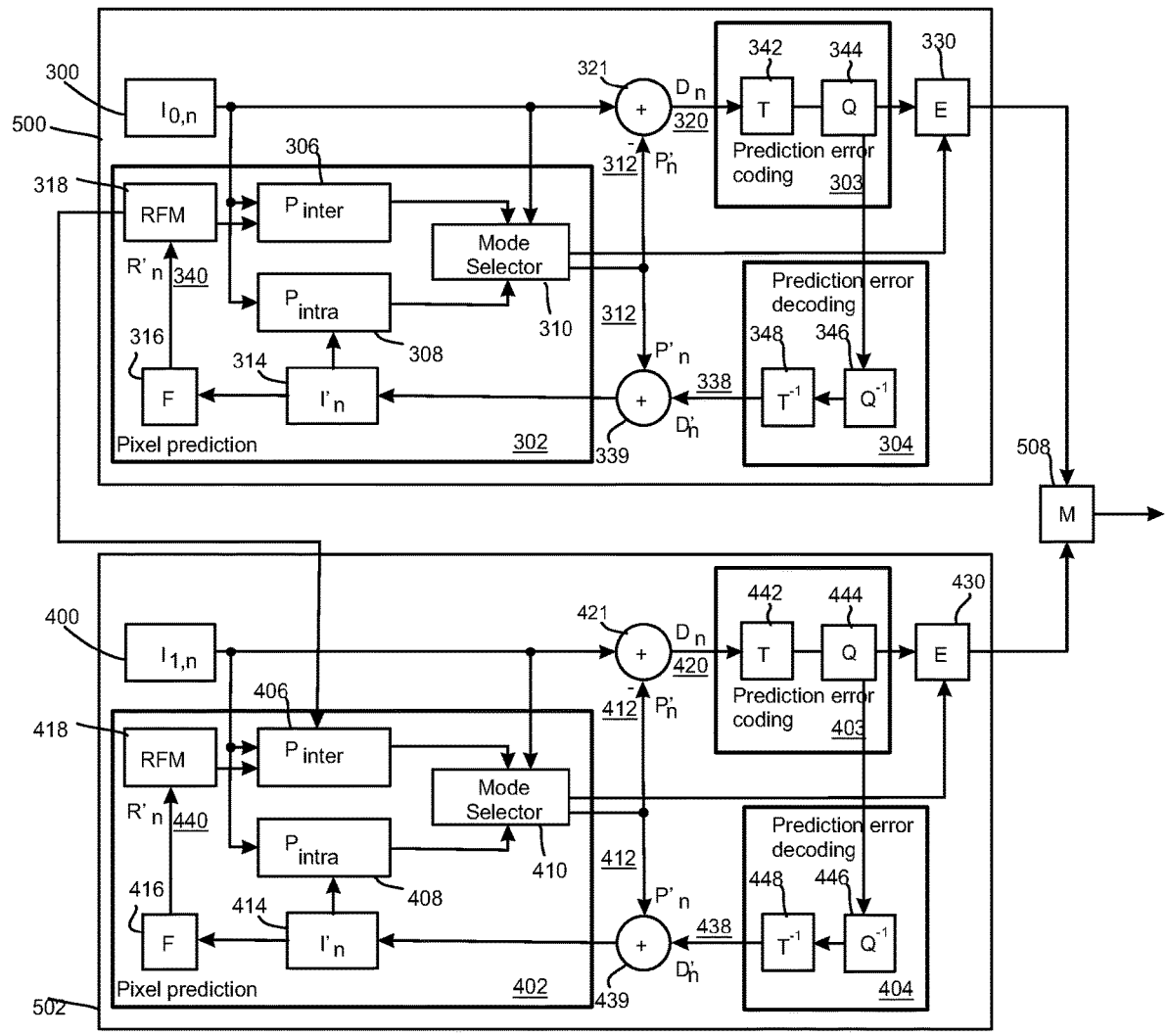
FIG. 4 shows schematically a block chart of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In some coding systems, such as HEVC, a picture can be partitioned in tiles, which are rectangular and contain an integer number of blocks, such as LCUs in HEVC. In HEVC, the partitioning to tiles forms a regular grid that may be characterized by a list of tile column widths and a list of tile row heights. Tiles are ordered in the bitstream consecutively in the raster scan order of the tile grid. A tile may contain an integer number of slices, or a slice may contain an integer number of tiles. The blocks (such as CTUs in HEVC) may be scanned in encoding and decoding tile-wise in the raster scan order of blocks, and tiles may be scanned in raster scan order along the tile grid.

Video coding standards and specifications may allow encoders to divide a coded picture to coded slices or alike. In-picture prediction is typically disabled across slice boundaries. Thus, slices can be regarded as a way to split a coded picture to independently decodable pieces. Slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighbouring block may be regarded as unavailable for intra prediction, if the neighbouring block resides in a different slice.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In wavefront parallel processing (WPP) each block row (such as CTU row in HEVC) of a slice can be encoded and decoded in parallel. When WPP is used, the state of the entropy codec at the beginning of a block row is obtained from the state of the entropy codec of the block row above after processing the second block of that row. Consequently, block rows can be processed in parallel with a delay of 2 blocks per each block row.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that slices, wavefronts and tiles, also when included in MCTSs, may be used as parallelization tools to enable running several encoding and/or decoding threads or processes in parallel.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9 −3)/16, when omitting the potential impact of a clipping operation.

An example of SAO is given next with reference to HEVC; however, SAO can be similarly applied to other coding schemes too. In SAO, a picture is divided into regions where a separate SAO decision is made for each region. In HEVC, the basic unit for adapting SAO parameters is CTU (therefore an SAO region is the block covered by the corresponding CTU).

In the SAO algorithm, samples in a CTU are classified according to a set of rules and each classified set of samples are enhanced by adding offset values. The offset values are signalled in the bitstream. There are two types of offsets: 1) Band offset 2) Edge offset. For a CTU, either no SAO or band offset or edge offset is employed. Choice of whether no SAO or band or edge offset to be used may be decided by the encoder with e.g. rate distortion optimization (RDO) and signaled to the decoder.

In the band offset, the whole range of sample values is in some embodiments divided into 32 equal-width bands. For example, for 8-bit samples, width of a band is 8 (=256/32). Out of 32 bands, 4 of them are selected and different offsets are signalled for each of the selected bands. The selection decision is made by the encoder and may be signalled as follows: The index of the first band is signalled and then it is inferred that the following four bands are the chosen ones. The band offset may be useful in correcting errors in smooth regions.

In the edge offset type, the edge offset (EO) type may be chosen out of four possible types (or edge classifications) where each type is associated with a direction: 1) vertical, 2) horizontal, 3) 135 degrees diagonal, and 4) 45 degrees diagonal. The choice of the direction is given by the encoder and signalled to the decoder. Each type defines the location of two neighbour samples for a given sample based on the angle. Then each sample in the CTU is classified into one of five categories based on comparison of the sample value against the values of the two neighbour samples. After each sample in an edge offset type CTU is classified as one of the five categories, an offset value for each of the first four categories is determined and signalled to the decoder. The offset for each category is added to the sample values associated with the corresponding category. Edge offsets may be effective in correcting ringing artifacts.

The adaptive loop filter (ALF) is another method to enhance quality of the reconstructed samples. This may be achieved by filtering the sample values in the loop. In some embodiments the encoder determines which region of the pictures are to be filtered and the filter coefficients based on e.g. RDO and this information is signalled to the decoder.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. A picture at temporal sub-layer with TemporalId equal to N may be predicted from reference pictures at temporal sub-layers with TemporalId less than or equal to N (unless further constrained by the picture type as explained below) and is disallowed or disabled to be predicted from reference pictures at temporal sub-layers with TemporalId greater than N. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture.

A Random Access Point (RAP) picture, which may also be referred to as an intra random access point (IRAP) picture in an independent layer contains only intra-coded slices. An IRAP picture belonging to a predicted layer may contain P, B, and I slices, cannot use inter prediction from other pictures in the same predicted layer, and may use inter-layer prediction from its direct reference layers. In the present version of HEVC, an IRAP picture may be a BLA picture, a CRA picture or an IDR picture. The first picture in a bitstream containing a base layer is an IRAP picture at the base layer. Provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. The IRAP picture belonging to a predicted layer and all subsequent non-RASL pictures in decoding order within the same predicted layer can be correctly decoded without performing the decoding process of any pictures of the same predicted layer that precede the IRAP picture in decoding order, when the necessary parameter sets are available when they need to be activated and when the decoding of each direct reference layer of the predicted layer has been initialized. There may be pictures in a bitstream that contain only intra-coded slices that are not IRAP pictures.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Several candidate motion vectors may be derived for a single prediction unit. For example, motion vector prediction HEVC includes two motion vector prediction schemes, namely the advanced motion vector prediction (AMVP) and the merge mode. In the AMVP or the merge mode, a list of motion vector candidates is derived for a PU. There are two kinds of candidates: spatial candidates and temporal candidates, where temporal candidates may also be referred to as TMVP candidates.

A candidate list derivation may be performed for example as follows, while it should be understood that other possibilities may exist for candidate list derivation. If the occupancy of the candidate list is not at maximum, the spatial candidates are included in the candidate list first if they are available and not already exist in the candidate list. After that, if occupancy of the candidate list is not yet at maximum, a temporal candidate is included in the candidate list. If the number of candidates still does not reach the maximum allowed number, the combined bi-predictive candidates (for B slices) and a zero motion vector are added in. After the candidate list has been constructed, the encoder decides the final motion information from candidates for example based on a rate-distortion optimization (RDO) decision and encodes the index of the selected candidate into the bitstream. Likewise, the decoder decodes the index of the selected candidate from the bitstream, constructs the candidate list, and uses the decoded index to select a motion vector predictor from the candidate list.

In HEVC, AMVP and the merge mode may be characterized as follows. In AMVP, the encoder indicates whether uni-prediction or bi-prediction is used and which reference pictures are used as well as encodes a motion vector difference. In the merge mode, only the chosen candidate from the candidate list is encoded into the bitstream indicating the current prediction unit has the same motion information as that of the indicated predictor. Thus, the merge mode creates regions composed of neighbouring prediction blocks sharing identical motion information, which is only signalled once for each region.

An example of the operation of advanced motion vector prediction is provided in the following, while other similar realizations of advanced motion vector prediction are also possible for example with different candidate position sets and candidate locations with candidate position sets. It also needs to be understood that other prediction mode, such as the merge mode, may operate similarly. Two spatial motion vector predictors (MVPs) may be derived and a temporal motion vector predictor (TMVP) may be derived. They may be selected among the positions: three spatial motion vector predictor candidate positions located above the current prediction block ($B_0$, $B_1$, $B_2$) and two on the left ($A_0$, $A_1$). The first motion vector predictor that is available (e.g. resides in the same slice, is inter-coded, etc.) in a pre-defined order of each candidate position set, ($B_0$, $B_1$, $B_2$) or ($A_0$, $A_1$), may be selected to represent that prediction direction (up or left) in the motion vector competition. A reference index for the temporal motion vector predictor may be indicated by the encoder in the slice header (e.g. as a collocated_ref_idx syntax element). The first motion vector predictor that is available (e.g. is inter-coded) in a pre-defined order of potential temporal candidate locations, e.g. in the order ($C_0$, $C_1$), may be selected as a source for a temporal motion vector predictor. The motion vector obtained from the first available candidate location in the co-located picture may be scaled according to the proportions of the picture order count differences of the reference picture of the temporal motion vector predictor, the co-located picture, and the current picture. Moreover, a redundancy check may be performed among the candidates to remove identical candidates, which can lead to the inclusion of a zero motion vector in the candidate list. The motion vector predictor may be indicated in the bitstream for example by indicating the direction of the spatial motion vector predictor (up or left) or the selection of the temporal motion vector predictor candidate. The co-located picture may also be referred to as the collocated picture, the source for motion vector prediction, or the source picture for motion vector prediction.

Motion parameter types or motion information may include but are not limited to one or more of the following types:
  an indication of a prediction type (e.g. intra prediction, uni-prediction, bi-prediction) and/or a number of reference pictures;
  an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
  an indication of a reference picture type, such as a short-term reference picture and/or a long-term reference picture and/or an inter-layer reference picture (which may be indicated e.g. per reference picture)
  a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
  a horizontal motion vector component (which may be indicated e.g. per prediction block or per reference index or alike);
  a vertical motion vector component (which may be indicated e.g. per prediction block or per reference index or alike);
  one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
  coordinates of a block to which the motion parameters and/or motion information applies, e.g. coordinates of the top-left sample of the block in luma sample units;
  extents (e.g. a width and a height) of a block to which the motion parameters and/or motion information applies.

In general, motion vector prediction mechanisms, such as those motion vector prediction mechanisms presented above as examples, may include prediction or inheritance of certain pre-defined or indicated motion parameters.

A motion field associated with a picture may be considered to comprise of a set of motion information produced for every coded block of the picture. A motion field may be accessible by coordinates of a block, for example. A motion field may be used for example in TMVP or any other motion prediction mechanism where a source or a reference for prediction other than the current (de)coded picture is used.

Different spatial granularity or units may be applied to represent and/or store a motion field. For example, a regular grid of spatial units may be used. For example, a picture may be divided into rectangular blocks of certain size (with the possible exception of blocks at the edges of the picture, such as on the right edge and the bottom edge). For example, the size of the spatial unit may be equal to the smallest size for which a distinct motion can be indicated by the encoder in the bitstream, such as a 4×4 block in luma sample units. For example, a so-called compressed motion field may be used, where the spatial unit may be equal to a pre-defined or indicated size, such as a 16×16 block in luma sample units, which size may be greater than the smallest size for indicating distinct motion. For example, an HEVC encoder and/or decoder may be implemented in a manner that a motion data storage reduction (MDSR) or motion field compression is performed for each decoded motion field (prior to using the motion field for any prediction between pictures). In an HEVC implementation, MDSR may reduce the granularity of motion data to 16×16 blocks in luma sample units by keeping the motion applicable to the top-left sample of the 16×16 block in the compressed motion field. The encoder may encode indication(s) related to the spatial unit of the compressed motion field as one or more syntax elements and/or syntax element values for example in a sequence-level syntax structure, such as a video parameter set or a sequence parameter set. In some (de)coding methods and/or devices, a motion field may be represented and/or stored according to the block partitioning of the motion prediction (e.g. according to prediction units of the HEVC standard). In some (de)coding methods and/or devices, a combination of a regular grid and block partitioning may be applied so that motion associated with partitions greater than a pre-defined or indicated spatial unit size is represented and/or stored associated with those partitions, whereas motion associated with partitions smaller than or unaligned with a pre-defined or indicated spatial unit size or grid is represented and/or stored for the pre-defined or indicated units.

Scalable video coding may refer to coding structure where one bitstream can contain multiple representations of the content, for example, at different bitrates, resolutions or frame rates. In these cases the receiver can extract the desired representation depending on its characteristics (e.g.

resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

Some scalable video coding schemes may require IRAP pictures to be aligned across layers in a manner that either all pictures in an access unit are IRAP pictures or no picture in an access unit is an IRAP picture. Other scalable video coding schemes, such as the multi-layer extensions of HEVC, may allow IRAP pictures that are not aligned, i.e. that one or more pictures in an access unit are IRAP pictures, while one or more other pictures in an access unit are not IRAP pictures. Scalable bitstreams with IRAP pictures or similar that are not aligned across layers may be used for example for providing more frequent IRAP pictures in the base layer, where they may have a smaller coded size due to e.g. a smaller spatial resolution. A process or mechanism for layer-wise start-up of the decoding may be included in a video decoding scheme. Decoders may hence start decoding of a bitstream when a base layer contains an IRAP picture and step-wise start decoding other layers when they contain IRAP pictures. In other words, in a layer-wise start-up of the decoding mechanism or process, decoders progressively increase the number of decoded layers (where layers may represent an enhancement in spatial resolution, quality level, views, additional components such as depth, or a combination) as subsequent pictures from additional enhancement layers are decoded in the decoding process. The progressive increase of the number of decoded layers may be perceived for example as a progressive improvement of picture quality (in case of quality and spatial scalability).

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

Scalability may be enabled in two basic ways. Either by introducing new coding modes for performing prediction of pixel values or syntax from lower layers of the scalable representation or by placing the lower layer pictures to a reference picture buffer (e.g. a decoded picture buffer, DPB) of the higher layer. The first approach may be more flexible and thus may provide better coding efficiency in most cases. However, the second, reference frame based scalability, approach may be implemented efficiently with minimal changes to single layer codecs while still achieving majority of the coding efficiency gains available. Essentially a reference frame based scalability codec may be implemented by utilizing the same hardware or software implementation for all the layers, just taking care of the DPB management by external means.

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

Recently, the development of various neural network (NN) techniques, especially the ones related to deep learning, has enabled to learn algorithms for several tasks from the raw data, which algorithms may outperform algorithms which have been developed for many years using traditional (non-learning based) methods.

Artificial neural networks, or simply neural networks, are parametric computation graphs consisting of units and connections. The units are usually arranged in successive layers, and in most neural network architectures only units in adjacent layers are connected. Each connection has an associated parameter or weight, which defines the strength of the connection. The weight gets multiplied by the incoming signal in that connection. In fully-connected layers of a feedforward neural network, each unit in a layer is connected to each unit in the following layer. So, the signal which is output by a certain unit gets multiplied by the connections connecting that unit to another unit in the following layer. The latter unit then may perform a simple operation such as a sum of the weighted signals.

Apart from fully-connected layers, there are different types of layers, such as but not limited to convolutional layers, non-linear activation layers, batch-normalization layers, and pooling layers.

The input layer receives the input data, such as images, and the output layer is task-specific and outputs an estimate of the desired data, for example a vector whose values represent a class distribution in the case of image classification. The "quality" of the neural network's output is evaluated by comparing it to ground-truth output data. This comparison would then provide a "loss" or "cost" function.

The weights of the connections represent the biggest part of the learnable parameters of a neural network. Other learnable parameters may be for example the parameters of the batch-normalization layer.

The parameters are learned by means of a training algorithm, where the goal is to minimize the loss function on a training dataset. The training dataset is regarded as a representative sample of the whole data. One popular learning approach is based on iterative local methods, where the loss is minimized by following the negative gradient direction. Here, the gradient is understood to be the gradient of the loss with respect to the weights of the neural network. The loss is represented by the reconstructed prediction error. Computing the gradient on the whole dataset may be computationally too heavy, thus learning is performed in sub-steps, where at each step a mini-batch of data is sampled and gradients are computed from the mini-batch. This is regarded to as stochastic gradient descent. The gradients are usually computed by back-propagation algorithm, where errors are propagated from the output layer to the input layer, by using the chain rule for differentiation. If the loss function or some components of the neural network are not differentiable, it is still possible to estimate the gradient of the loss by using policy gradient methods, such as those used in reinforcement learning. The computed gradients are then used by one of the available optimization routines (such as stochastic gradient descent, Adam, RMSprop, etc.), to compute a weight update, which is then applied to update the weights of the network. After a full pass over the training dataset, the process is repeated several times until a convergence criterion is met, usually a generalization criterion. The gradients of the loss, i.e., the gradients of the reconstructed prediction error with respect to the weights of the neural network, may be referred to as the training signal.

Online training consists of learning the parameters of the neural network continuously on a stream of data, as opposed to the case where the dataset is finite and given in its entirety and the network is used only after training has completed.

There have been several approaches to using neural nets for performing most computation blocks in data compression pipelines. When these neural nets are all trained simultaneously, this approach is usually referred to as end-to-end deep learning based compression. In such systems, one or more neural nets perform the compression steps, and one or more neural nets perform the de-compression steps. A simple approach would consist of using a "neural-encoder" network, which maps the input data to a latent space, where the data is compressed into a lower-dimensional vector. This vector could then be quantized and entropy-encoded. The decoder would embed a so-called "neural-decoder" network which would map back the de-quantized and entropy-decoded latent code to the image space.

Some neural net approaches have been developed for implementing video/image video coding tools through deep learning. For example, a neural net-based intra prediction has been introduced, where a prediction block is generated from neighboring decoded blocks used a neural net. In block-wise reduced resolution coding with neural net-based upsampling, a block (such as a CTU in HEVC) is adaptively encoded either with full spatial resolution or reduced spatial resolution, e.g. depending on rate-distortion optimized selection. In order to keep the coding and decoding for other blocks unchanged, the reconstructed reduced resolution block is upsampled to full resolution within the coding/decoding loop. The upsampling is adaptively selected between a conventional upsampler and a NN-based upsampler.

However, these neural net approaches are focused on enhancing the encoding through improving the operation of the coding tools. Nevertheless, more significant advances could be achieved in the efficiency of neural net-based prediction for video/image compression if the prediction can adapt itself to the encoded content.

Now an enhanced method for neural net-based video/image encoding is introduced.

Figure 5:
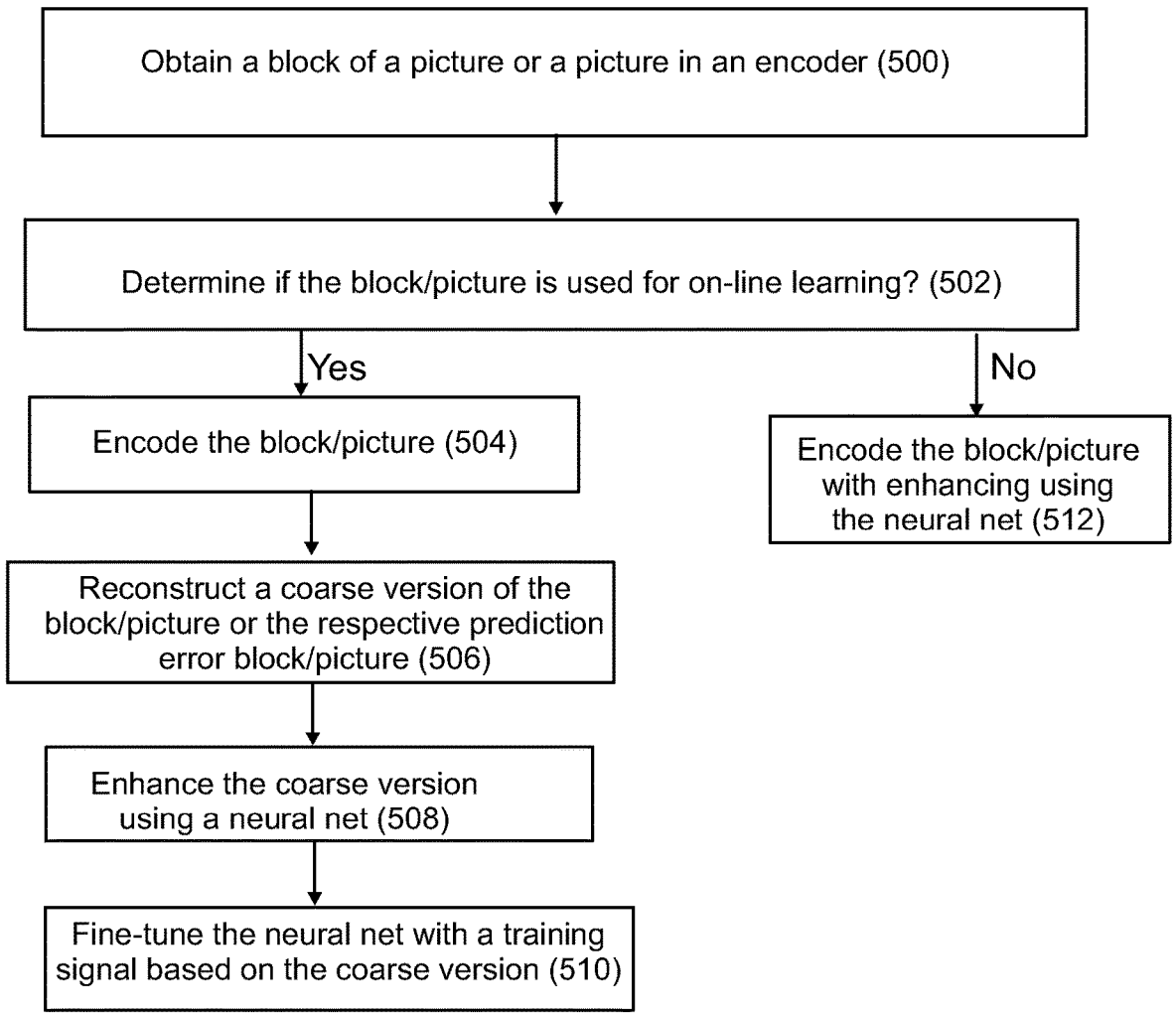
FIG. 5 shows a flow chart of an encoding method according to an embodiment of the invention.

The method, which is depicted in the flow chart of FIG. 5, comprises obtaining (500) a block of a picture or a picture in an encoder; determining (502) if the block/picture is used for on-line learning; if affirmative, encoding (504) the block/picture; reconstructing (506) a coarse version of the block/picture or the respective prediction error block/picture; enhancing (508) the coarse version using a neural net; fine-tuning (510) the neural net with a training signal based on the coarse version; and in response to the block/picture not being used for on-line learning, encoding (512) the block/picture with enhancing using the neural net.

Figure 6:
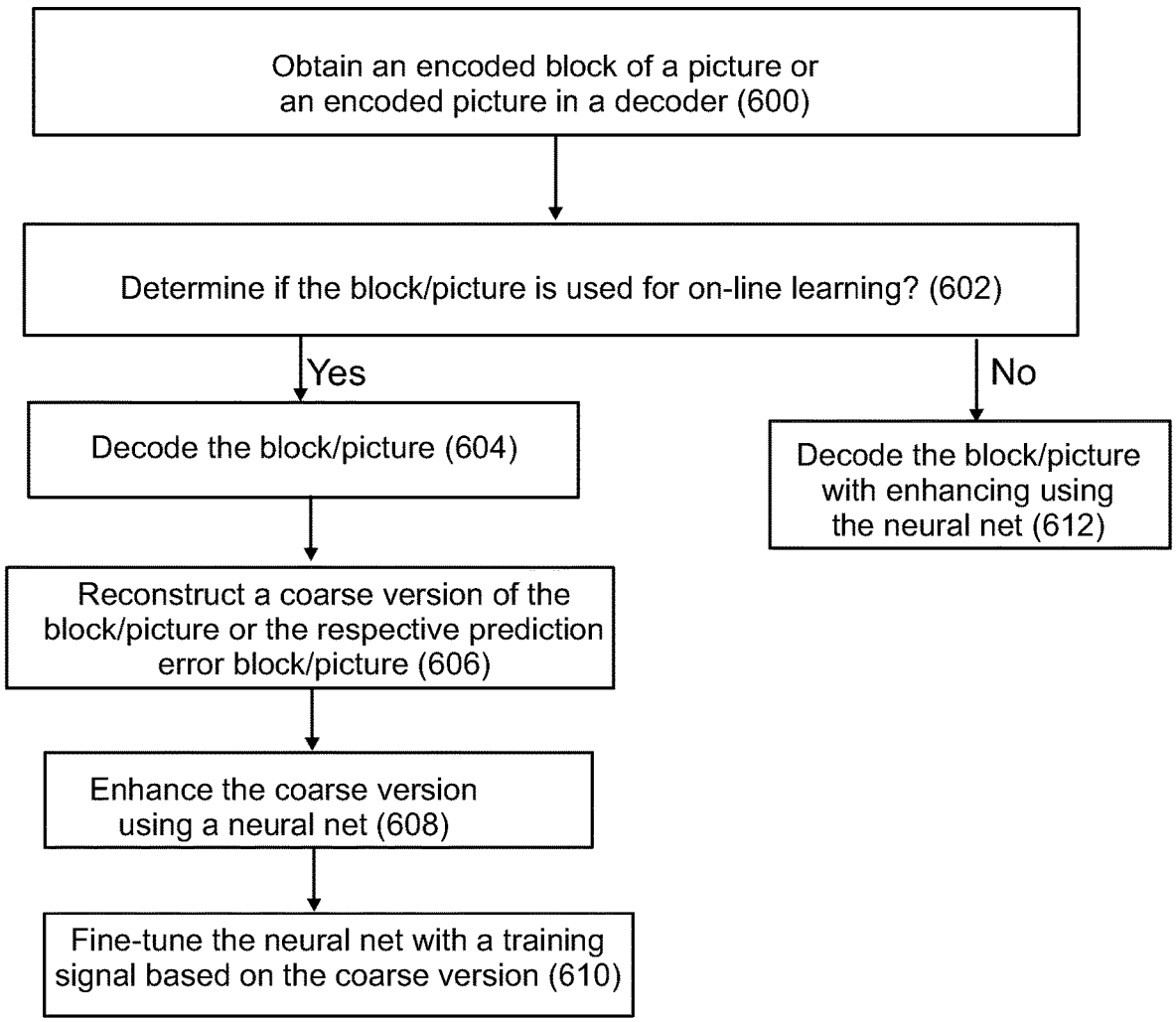
FIG. 6 shows a flow chart of a decoding method according to an embodiment of the invention.

A respective decoding method, which is depicted in the flow chart of FIG. 6, comprises obtaining (600) an encoded block of a picture or an encoded picture in a decoder; determining (602) if the block/picture is used for on-line learning; if affirmative, decoding (604) the block/picture; reconstructing (606) a coarse version of the block/picture or the respective prediction error block/picture; enhancing (608) the coarse version using a neural net; fine-tuning (610) the neural net with a training signal based on the coarse version; and in response to the block/picture not being used for on-line learning, decoding (612) the block/picture with enhancing using the neural net.

It needs to be understood that even though figures and embodiments are described with reference to a block or a picture, the embodiments can be applied on the basis of any spatial units ranging from a block to a picture. For example, the embodiments can be similarly realized for a slice.

Herein, the neural net is pre-trained for the use of the encoder and the decoder for enhancing reconstructed blocks or pictures or reconstructed prediction error blocks or pictures. The neural net based enhancement may for example conceal some visual artefacts caused by coarse quantization, such as blocking or ringing.

The pre-trained neural net is delivered to the encoder and the decoder for example in one of the following ways:

The pre-trained neural net may be pre-defined e.g. in a coding standard and hence known by both the encoder and the decoder.

The pre-training is performed by an entity external to the encoder and the decoder and delivered to both the encoder and the decoder in advance of the encoding or decoding a bitstream.

The pre-training is performed by the encoder or the encoder has other means to obtain the pre-trained network. The network is included in or along the bitstream, out of which the decoder decodes the neural net. For example, a specific parameter set, e.g. referred to as neural net parameter set, may be specified for the delivery of the neural net in or along the bitstream. The use of the specific neural net parameter set may be indicated e.g. in sequence, picture, or slice level, e.g. in the sequence parameter set, the picture parameter set, or the slice header, respectively.

The embodiments are not limited to any particular neural network representation syntax, when a neural net is delivered to the encoder and/or to the decoder. The neural net type (e.g. fully convolutional neural net), essential parameters (e.g. the number of layers) and the parameters or weights for the neural net may be included in the neural network representation.

The embodiments are neither limited to any particular type of a neural network.

In the following, the steps of the method shown in FIGS. 5 and 6 and embodiments related thereto are described more in detail.

Determining if a Block/Picture is used for On-Line Learning (502, 602)

It is determined if a block/picture is used for on-line learning of the neural network. The encoder is either configured or makes a decision to encode certain blocks or pictures at a higher fidelity than other blocks or pictures. The encoder may select some or all of such higher-fidelity blocks or pictures as sources for on-line learning of the neural network.

According to an embodiment, the encoder includes, in or along the bitstream, information that is indicative of which blocks or pictures are used as sources for on-line learning. Respectively the decoder decodes, from or along the bitstream, information indicative of which blocks or pictures are used as source for on-line learning.

According to another embodiment, the encoder and decoder use the same heuristic process in determining if a block/picture is used for on-line learning of the neural network. The process may be pre-defined e.g. in a coding standard. The process may use input parameters, such as a quantization parameter and a coding mode for a block, or a picture type and a temporal sub-layer identifier (e.g. TemporalId value of HEVC). Some parameters for the process may be determined by the encoder and indicated in or along the bitstream, and respectively decoded from or along the bitstream by the decoder. For example, such parameters may include but are not limited to one or more of the following:

a maximum quantization parameter value to be used for on-line learning;

a list of block type(s), slice type(s), and/or picture type(s) to be used for on-line learning;

a list of prediction type(s) (e.g., intra prediction) and/or value sets of prediction parameter(s) (e.g. certain intra prediction modes) to be used for on-line learning; and/or a maximum sub-layer identifier value (e.g. a maximum TemporalId value of HEVC) to be used for on-line learning.

Figure 7:
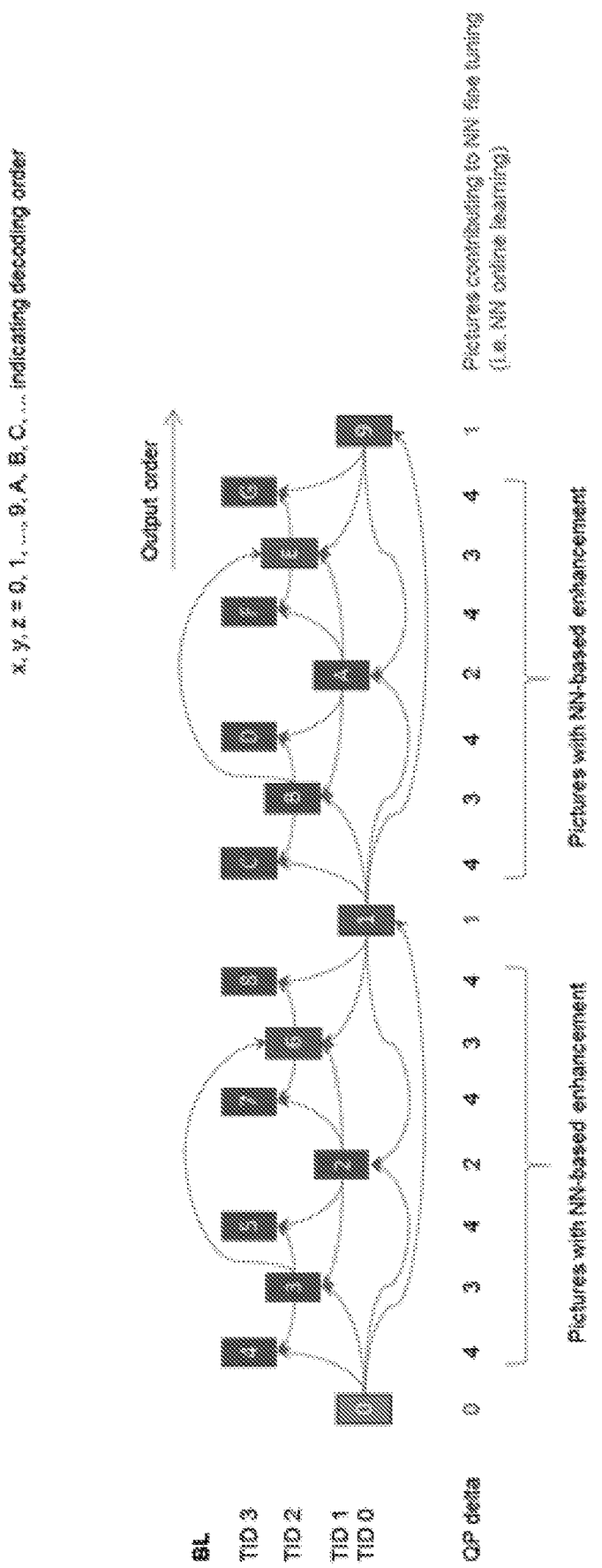
FIG. 7 shows a schematic diagram for determining if a picture is used as a source for on-line learning.

FIG. 7 shows a picture-based embodiment on determining if a picture is used as a source for on-line learning. FIG. 7 illustrates a typical hierarchical prediction structure of an HEVC bitstream. It can be noticed that a different quantization parameter (QP) value is used for pictures depending on the hierarchy and the picture type. The quantization parameter value is chosen to be equal to the sum of a base quantization parameter value (typically given as input to the encoder) and the QP delta value indicated in the figure. Consequently, pictures are coded with different fidelity into the bitstream. It can also be noticed that temporal sub-layers (as indicated by TemporalId, TID) are used in the example prediction hierarchy. In the example of FIG. 7, pictures contributing to the fine-tuning of the neural network are selected to be the pictures with TemporalId equal to 0.

According to an embodiment, the encoder selects the pictures for on-line learning based on but not limited to one or more of the following:

Using only the IRAP pictures as source for on-line learning

Using only inter-coded pictures (e.g. comprising P or B slices but not I slices of HEVC) for on-line learning, which may be further constrained e.g. by TemporalId and/or quantization parameter thresholds Using only pictures with selected TemporalId values for online learning Using only pictures with selected quantization parameter values (e.g. on picture or slice level) for online learning According to an embodiment, the encoder selects blocks for on-line learning based on but not limited to one or more of the following:

Using only blocks of IRAP pictures as source for on-line learning

Using only blocks of inter-coded pictures (e.g. comprising P or B slices but not I slices of HEVC) for on-line learning, which may be further constrained e.g. by TemporalId and/or quantization parameter thresholds Using only blocks of pictures with selected TemporalId values for online learning Using only blocks with selected quantization parameter values for online learning Regarding the information that is indicative of which blocks or pictures are used as sources for on-line learning, some embodiments related thereto are described in details in the following.

The information may be included in a syntax structure that corresponds to the spatiotemporal unit to which the information applies. For example:

Sequence parameter set (SPS), indicating e.g. that pictures or blocks of the sequence for which the SPS is active, are classified according to a pre-defined and/or indicated determination rules to those that are used as source for on-line learning or those that are enhanced using the neural net.

Picture parameter set (PPS), indicating that the information applies to the pictures for which the PPS is active.

Slice header, indicating that the information applies to the respective slice.

Coding unit (CU) syntax structure, indicating that the information applies to the CU.

According to an embodiment, context-based entropy (de)coding, such as CABAC, is applied to the syntax element (coding the information). This embodiment may be applied in block-level, e.g. for CU. For example, the blocks above and on the left may be used as the context. The context may be initialized e.g. based on picture or slice type and/or quantization parameter.

The information may be indicative of conditions for pictures or blocks classified as those used as source for on-line learning, and/or conditions for pictures or blocks classified as those enhanced using the neural net. For example, a maximum quantization parameter value for picture or blocks to be used as source for on-line learning may be provided as a part of the information.

Embodiments and/or indications may be applied for bi-level classification of spatiotemporal units, i.e. spatiotemporal units may either be contributing to NN fine-tuning or NN-enhanced.

Embodiments and/or indications may be applied for tri-level classification of spatiotemporal units, i.e. spatiotemporal units contribute to NN fine-tuning, or are NN-enhanced, or neither contribute to NN fine-tuning nor are NN-enhanced.

According to an embodiment, the syntax element for indicating if a block is used for on-line learning also indicates if a block is enhanced using the neural net. The syntax element may for example have three values:
- the block is used as source for on-line learning;
- the block is enhanced using the neural net;
- the block is neither used as source for on-line learning nor enhanced using the neural net.

Encoding/Decoding the Block/Picture (504/604)

When it is determined that the block/picture is used for on-line learning of the neural network, it is encoded or decoded, e.g. using conventional video/image encoding or decoding.

It is noted that steps 502/602 and 504/604 may also be ordered in a reverse order or step 502/602 may be a part of step 504/604. For example, if the determining for using on-line learning is performed depending on the quantization parameter value, the decoder needs to decode the quantization parameter value (as a part of step 604) before determining on use for on-line learning.

Reconstructing a Coarse Version of the Block/Picture or the Respective Prediction Error Block/Picture (506/606)

A coarse version of the block/picture or the respective prediction error block/picture is generated. The coarse version may be created by re-quantizing the reconstructed transform coefficients of the prediction error block/picture resulting from step 110 and reconstructing the respective coarse prediction error block/picture.

Enhancing the Coarse Version using the Neural Net (508/608)

The neural net is used for enhancing the reconstructed coarse version of the block/picture, such as the reconstructed coarse prediction error block/picture.

Fine-Tuning the Neural Net with a Training Signal Based on the Coarse Version (510/610)

A training signal is derived on the basis of the coarse version. For example, a training signal may be derived from the difference of the NN-enhanced reconstructed coarse prediction error block/picture and the reconstructed prediction error block/picture resulting from step 504/604. The training signal is used to tune the neural net, i.e. the training signal is used as input for on-line learning. More specifically, the coarse version is used as a basis to derive the loss information for computing the gradients for training the neural net. The parameters or weights for the neural net updated by the further training are used for enhancing subsequent blocks/pictures using the neural net. The neural net therefore adapts to the content.

According to an embodiment, the fine-tuning of the neural net comprises only deterministic computations in both encoder and decoder side. Thus, it is ensured that the encoder and decoder are kept in sync. In fact, some neural models embed some source of stochasticity (e.g., adding random noise), which would make encoder's and decoder's neural nets to deviate from each other. In the embodiments, such stochastic neural net models are not used or are used with pseudo-random noise that is identical in the encoder and decoder side. An encoder may indicate one or more seed values for such pseudo-random noise in or along the bitstream, and a decoder may decode one or more seed values for such pseudo-random noise from or along the bitstream. In addition, some efficient vectorised or otherwise parallelized implementations (e.g., for GPUs) of vector algebra are not deterministic because the order of operations is not predefined and thus floating point rounding errors are different. Thus it is important that the order of the operations is the same between the encoder and decoder. Another potential source of differences between encoder and decoder is in the way non-differentiable operations such as the rectified linear unit (ReLU) are handled during backpropagation—encoder and decoder need to agree on what value to assign to the derivative in the non-differentiable parts of such functions. For example, when input is zero, the ReLU function (which is a piece-wise linear function) is non-differentiable and the common practice is to assign either zero or one to the derivative in that point.

Encoding/Decoding the Block/Picture with Enhancing Using the Neural Net (512/612)

When it is determined that the block/picture is not used for on-line learning of the neural network, it is encoded or decoded, e.g. using conventional video/image encoding or decoding, including or followed by enhancing based on the neural net. For example, the neural net may be used for enhancing the reconstructed prediction error block/picture prior to reconstructing the block/picture by essentially summing up the respective prediction block/picture and the respective prediction error.

Embodiments can be realized based on at least the following inputs for the derivation of the training signal:

Option 1: The neural net outputs enhanced reconstructed prediction error. The training signal is derived from the (conventionally) reconstructed prediction error of a block/picture and the NN-enhanced reconstructed prediction error.

Option 2: The neural net outputs enhanced reconstructed prediction error. The training signal is derived from the (conventionally) reconstructed reference block/picture and the NN-enhanced reconstructed reference block/picture.

Option 3: The neural net outputs an enhanced reconstructed block/picture. The training signal is derived from the (conventionally) reconstructed reference block/picture and the NN-enhanced reconstructed block/picture that is reconstructed on the basis of the reconstructed prediction error from resulting from coarse quantization.

Option 4: The output of the neural net is a prediction error refinement, which is intended to be summed up with the reconstructed prediction error and/or the prediction block. The training signal is derived from the (conventionally) reconstructed reference block/picture, the reconstructed prediction error from resulting from coarse quantization, and the prediction error refinement.

It needs to be understood that the embodiments are not limited to the described options for the inputs of deriving the training signal. For example, the following inputs could additionally be provided for the training signal computation:

Coding modes, such as block type (e.g. intra or inter), quantization parameter value, identification of reference picture(s) for inter-coded blocks.

Prediction block/picture.

It also needs to be understood that options may be combined. For example, the training signal may be computed from the (conventionally) reconstructed reference block/picture, the (conventionally) reconstructed prediction error, and the NN-enhanced reconstructed prediction error.

Encoding a Block/Picture that is Used as Source for On-Line Learning (Option 1)

In the following, Option 1 is described in details below by referring to FIG. 8, which illustrates the operation of an encoder for blocks/pictures selected to be used as source for on-line learning.

The video/image encoder comprises at least one type of a predictor 802 and a prediction error encoder 816.

The predictor 802 takes as input:
The uncompressed input block or picture 804 to be encoded.
The reconstructed reference (block) 806 resulting from earlier encoding. This can comprise reconstructed blocks of the same picture that is currently being encoded and/or of reconstructed earlier pictures.

The predictor 802 implements one or more prediction operations, such as intra prediction and/or inter prediction, or modes thereof. Based on the inputs, the predictor 802 outputs:
A prediction block 808.
Prediction mode selections 810, such as intra prediction mode, indication of which reference picture is used for inter prediction, and/or motion vector for inter prediction.

The prediction error computation 812 takes as input the input block 804 and the prediction block 808 and computes their difference, which may be referred to as the prediction error or the prediction error block 814.

The prediction error is encoded in the prediction error encoder 816. A typical way for prediction error coding is to apply a transform, such as the discrete cosine transform, and quantize the transform coefficients in a first quantization. However, the embodiments are not limited to this type of prediction error coding only.

An encoded representation 818 of the prediction error, such as the quantized transform coefficients, are encoded by the entropy encoder 820, for example using the context-adaptive binary arithmetic coding (CABAC), into a bitstream.

A reconstructed prediction error is derived. For example, the quantized transform coefficients may be inverse-quantized and inverse-transformed in a first inverse quantization and transform unit 822 to form a reconstructed prediction error block 824.

In the compensation process 826, the reconstructed prediction error block 824 is sample-wise summed up with the prediction block 808 to form a reconstructed reference (block) 806. The compensation process 826 may also comprise additional operations, such as filtering, e.g. deblocking loop filtering and/or sample adaptive offset filtering. The reconstructed reference block 806 may be stored as a part of a reconstructed reference picture to be used as input for subsequent predictions.

In the second quantization process 828, the quantized transform coefficients are quantized more coarsely. A certain target quantization parameter value may be selected for this second quantization step 828. Alternatively to two successive quantization steps illustrated in FIG. 8, i.e. the first "regular" quantization 816 followed by the second quantization 828, the transform coefficients could be coarsely quantized in a single quantization step.

A reconstructed prediction error 832 for the more coarsely quantized prediction error is derived. For example, the quantized transform coefficients may be inverse-quantized (compensating both the first and second quantization) and inverse-transformed a second inverse quantization and transform unit 830 to form a reconstructed prediction error block. The inverse-quantization may be performed in one or two steps. In the latter case, the inverse quantization is first performed as an inverse operation to the second (i.e. coarser) quantization, and then inverse quantization is performed as an inverse operation to the first (regular) quantization.

The reconstructed prediction error for the more coarsely quantized prediction error is enhanced using the neural net 834. The output of this step is referred to as enhanced reconstructed prediction error 836.

An initial version of the neural net is a pre-defined for or shared between the encoder and the decoder. For example, the initial parameters or weights for the neural net may be defined in a video/image coding standard. In another example, the initial parameters or weights are coded and transmitted in or along the video/image bitstream.

A training signal is computed in a computing unit 838 by taking as inputs the reconstructed prediction error 824 and the enhanced reconstructed prediction error 836. In an embodiment, the training signal comprises the gradient of the loss, where the loss is represented by the difference of the reconstructed prediction error and the enhanced reconstructed prediction error. The training signal is used to fine-tune the neural net in a fine-tuning unit 840.

According to a further embodiment, the encoder and decoder may perform the so-called "curriculum learning" in an online fashion. Curriculum learning consists of increasing the difficulty of the learning task gradually, starting from a simpler version of the task to more and more difficult versions of the task. This may be implemented by having the Second Quantization perform quantization using a variable quantization parameter, so that at the beginning the quantization parameter is similar to the regular quantization parameter, and it is then increased gradually during the training process, for example every time the neural network loss does not decrease more than a threshold. In an alternative implementation of this additional embodiment, the second quantization 828 may start from a much higher quantization parameter with respect to the regular quantization parameter and decrease it gradually during the training process. This second case may be useful in case the utilized neural network architecture is more suitable for learning big differences between input and target output. This embodiment may require signaling from encoder to decoder about which quantization parameter the second quantization 828 need to use.

According to a further embodiment the second quantization is performed directly on the transform coefficients by-passing the first quantization. In this embodiment the output of the transform is thus input to both first quantization and second quantization which are then performing quantization operations with different parameters resulting in two sets of quantized coefficients.

According to a further embodiment the coarsely quantized reconstructed prediction error may be generated by impairing the reconstructed prediction error from the first inverse quantization and transform. That signal can be for example filtered, quantized in sample domain, or modified by other signal processing means. Such processing can be further combined with a second transformation and quantization process; and the inverse of those. Also, the first quantized transform coefficients may be further processed before second quantization when generating the coarsely quantized version of the prediction error.

In the following, implementation examples for the options 2-4 for encoding blocks/pictures contributing to the NN fine tuning are illustrated by referring to FIGS. 9a-9c respectively, where encoding process operate similarly to option 1 except for the derivation of the training signal.

Encoding a Block/Picture that is Used as Source for On-Line Learning (Option 2)

Figure 8:
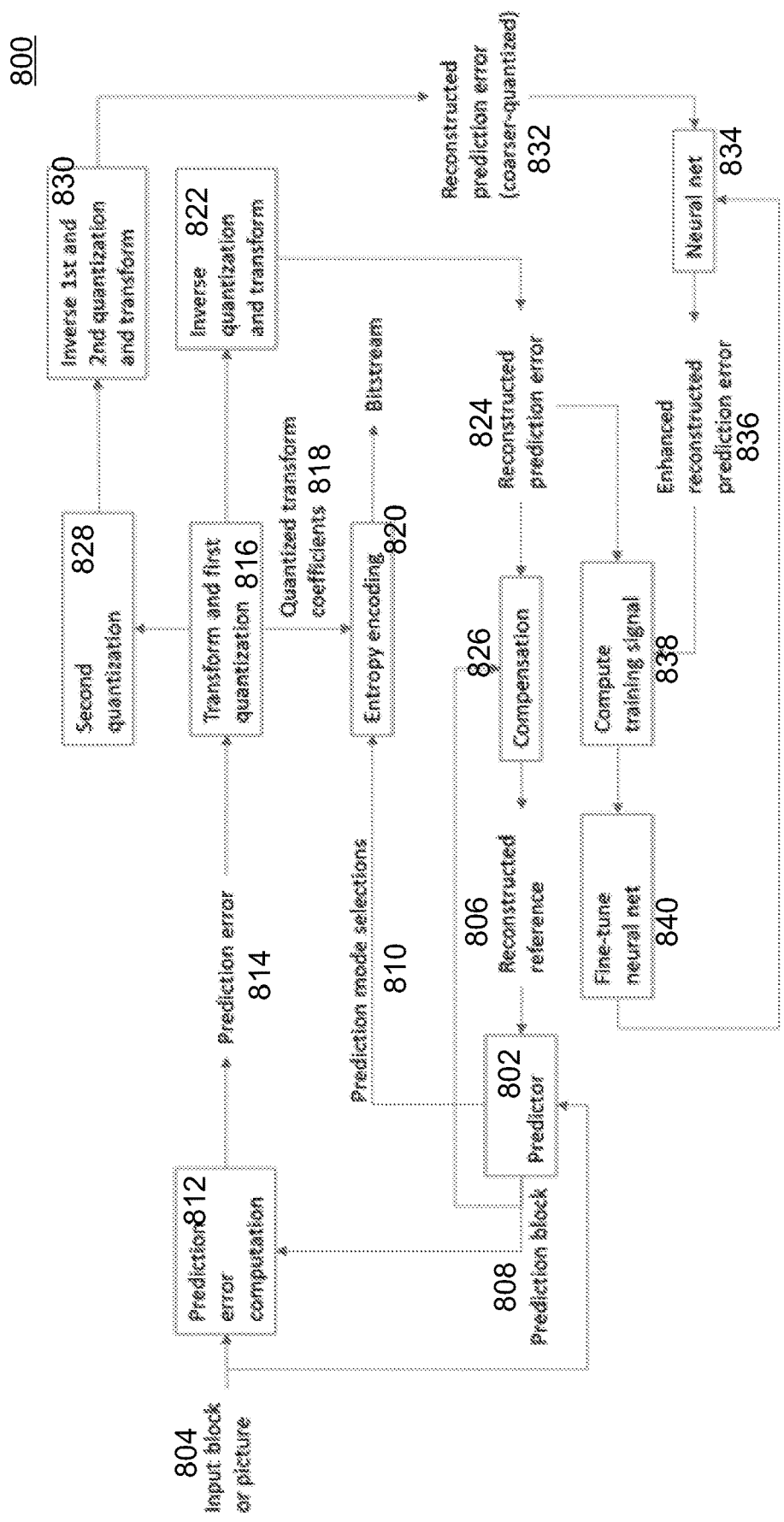
FIG. 8 shows a schematic diagram of an encoder suitable for implementing embodiments of the invention.
Figure 9A:
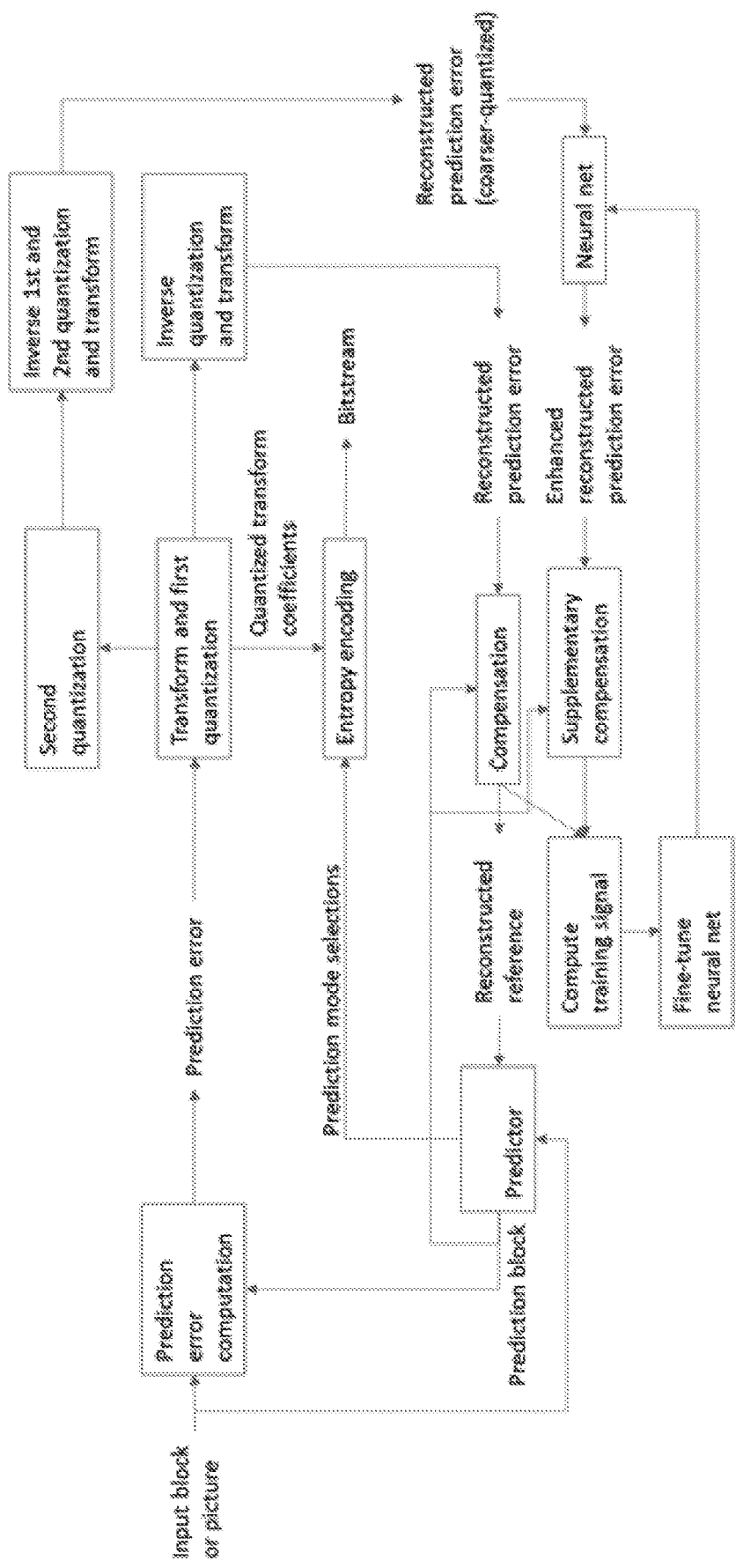
FIGS. 9a-9f show schematic diagrams of decoders suitable for implementing various embodiments of the invention.

FIG. 9a illustrates the operation of an encoder for blocks/pictures selected to be used as source for on-line learning for option 2. For the derivation of the training signal, there are two compensation steps: in addition to the compensation step, as disclosed in FIG. 8, there is a supplementary compensation step.

The compensation and supplementary compensation steps operate otherwise identically but the compensation step takes the (conventionally) reconstructed prediction error as input and the supplementary compensation step takes the enhanced reconstructed prediction error as input. Also, the compensation step outputs to the reconstructed reference generation, while the supplementary compensation step does not.

The training signal computation takes as input:
the (conventionally) reconstructed reference block/picture, and
the NN-enhanced reconstructed reference block/picture, where the NN-based enhancement is applied to the coarser-quantized reconstructed prediction error.

According to an embodiment, the training signal comprises the gradient of the loss, where the loss is represented by the difference of the (conventionally) reconstructed reference block/picture and the NN-enhanced reconstructed reference block/picture.

Encoding a Block/Picture that is Used as Source for On-Line Learning (Option 3)

Figure 9B:
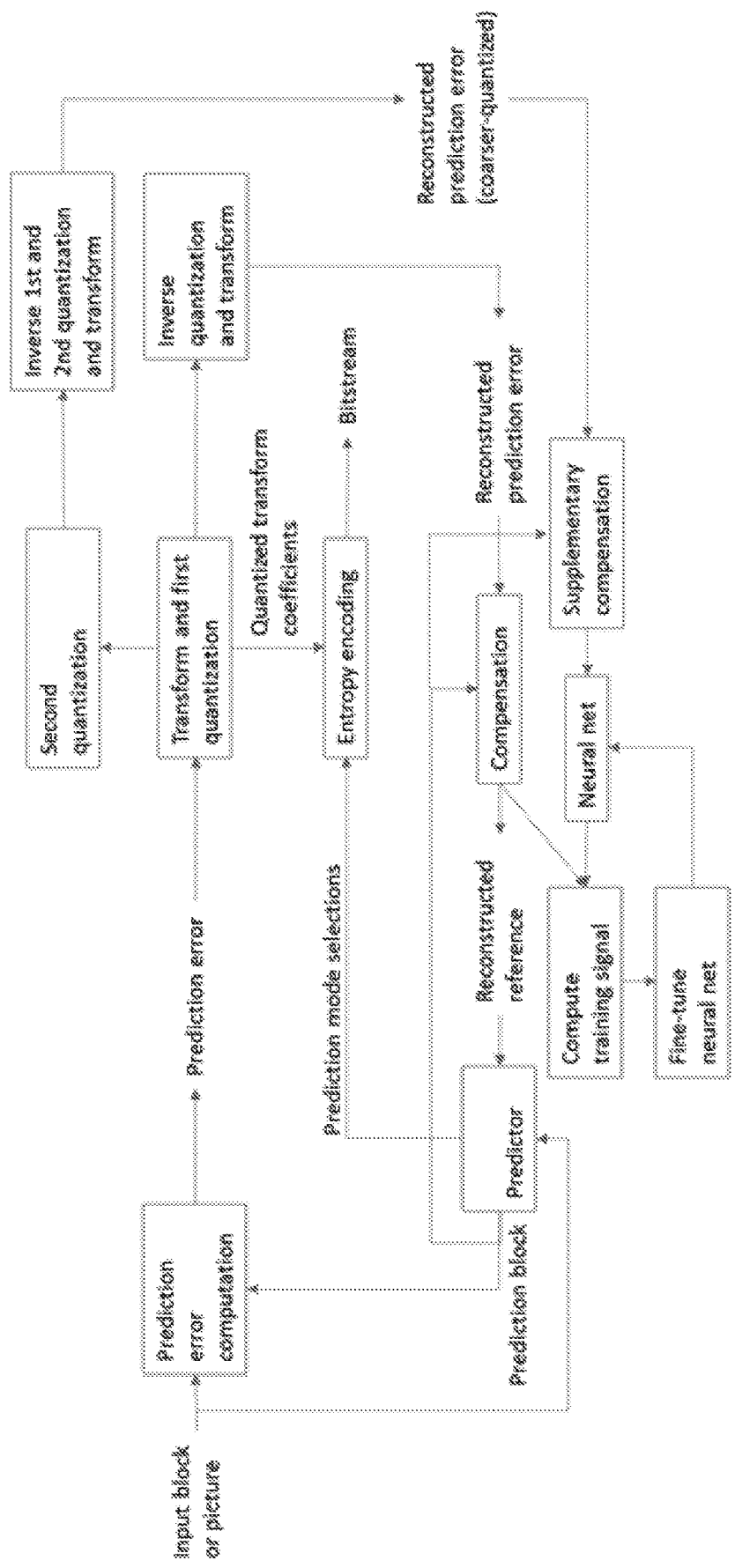

FIG. 9b illustrates the operation of an encoder for blocks/pictures selected to be used as source for on-line learning for option 3. As a difference to the encoder of FIG. 9a, the NN-enhancement is applied to the output of the supplementary compensation step.

According to an embodiment, the training signal comprises the gradient of the loss, where the loss is represented by the difference of the (conventionally) reconstructed reference block/picture and the NN-enhanced reconstructed reference block/picture.

Encoding a Block/Picture that is Used as Source for On-Line Learning (Option 4)

Figure 9C:
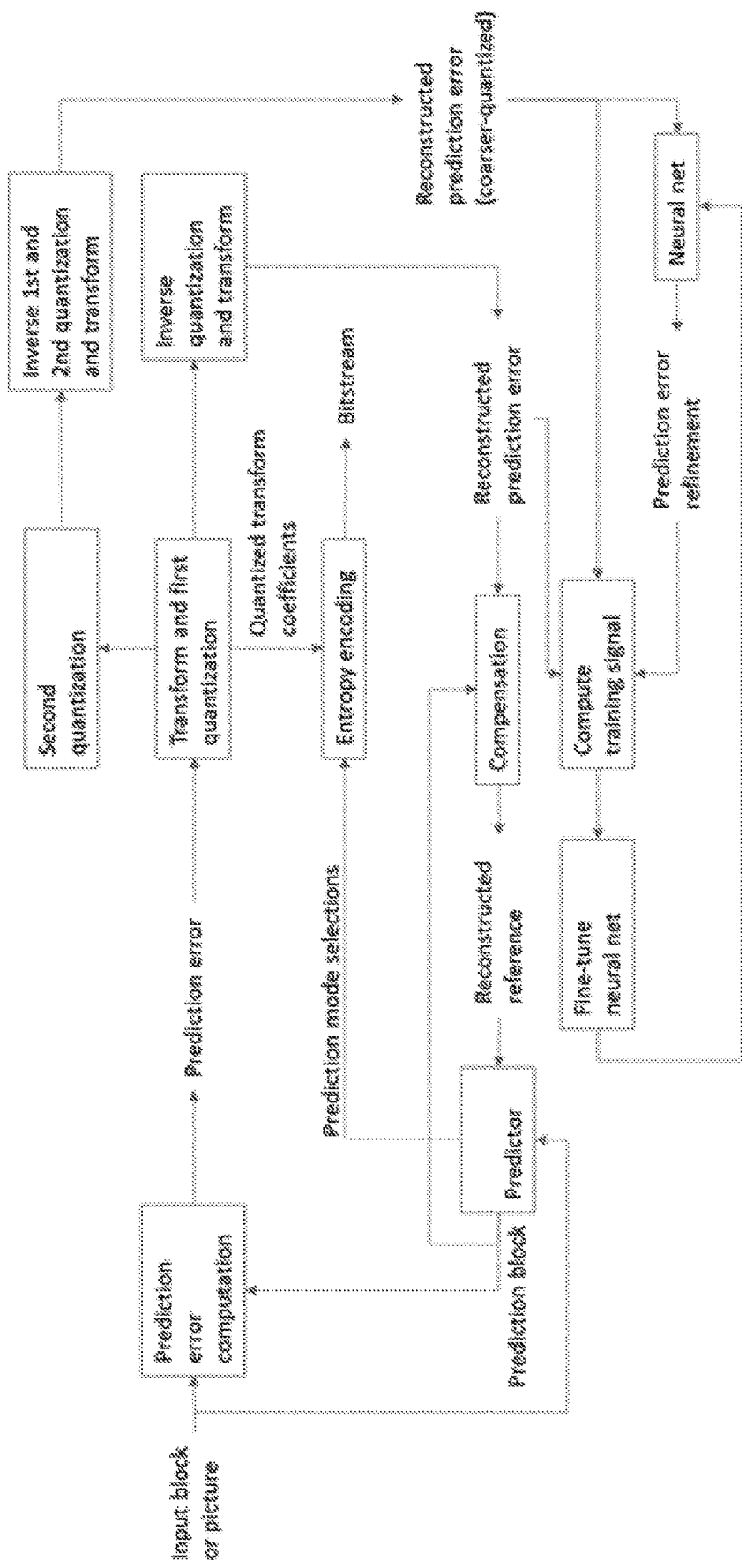

FIG. 9c illustrates the operation of an encoder for blocks/pictures selected to be used as source for on-line learning for option 4. For the derivation of the training signal, there is only one compensation step, like in the encoder of FIG. 8, but the training signal computation takes as input:
the (conventionally) reconstructed reference block/picture,
the coarser-quantized reconstructed prediction error, and
the NN-enhanced reconstructed reference block/picture, where the NN-based enhancement is applied to the coarser-quantized reconstructed prediction error.

According to an embodiment, an enhanced reconstructed prediction error is derived by essentially summing up sample-wise the reconstructed prediction error (coarse-quantized) and the prediction error refinement. The training signal comprises the gradient of the loss, where the loss is represented by the difference of the reconstructed prediction error and the enhanced reconstructed prediction error.

In the following, implementation examples for the options 1-4 for encoding blocks/pictures enhanced by the neural net are illustrated by referring to FIGS. 9d-9f.

Encoding a Block/Picture that is Enhanced with the Neural Net (Option 1 and 2)

Figure 9D:
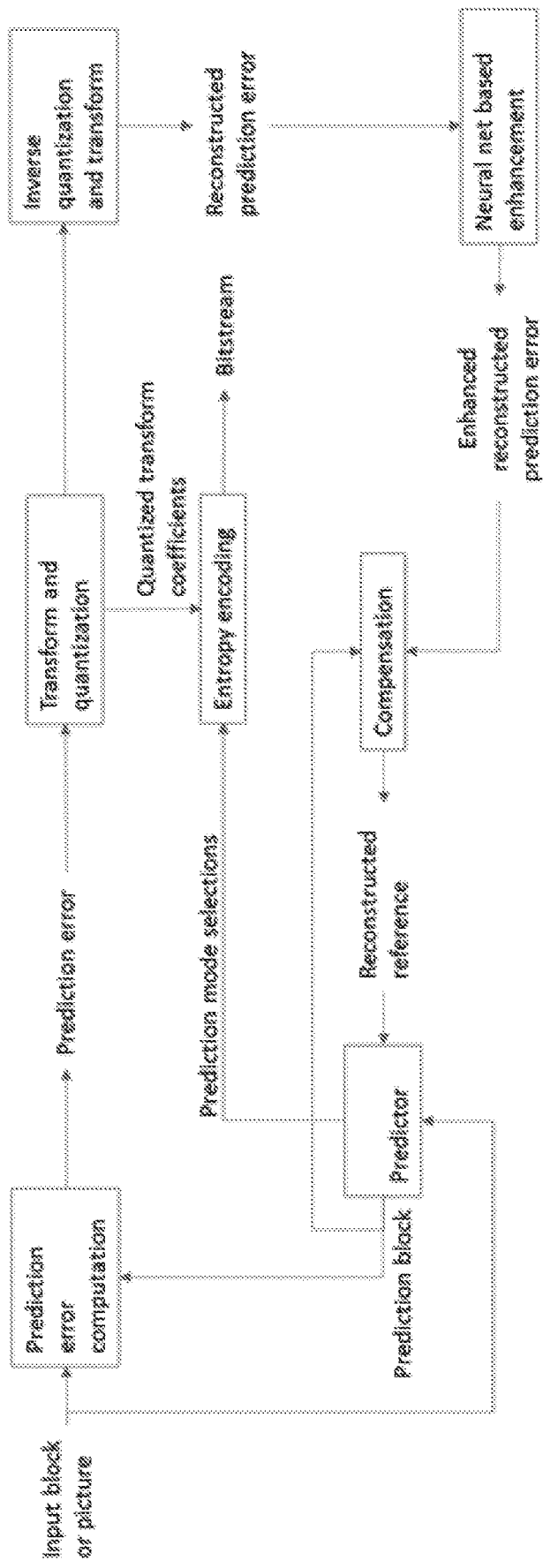

FIG. 9d illustrates the operation of an encoder for blocks/pictures selected to be enhanced by the neural net that outputs an enhanced reconstructed prediction error block/picture. The steps operate similarly to the encoder of FIG. 8, but there is only one quantization step, wherein the quantization parameter value or the quantization step size in "Transform and quantization" is "coarse", i.e. similar to what was used in the second quantization step 828 in FIG. 8. Moreover, the compensation step takes the enhanced reconstructed prediction error as input, not the (conventionally) reconstructed prediction error.

Encoding a Block/Picture that is Enhanced with the Neural Net (Option 3)

Figure 9E:
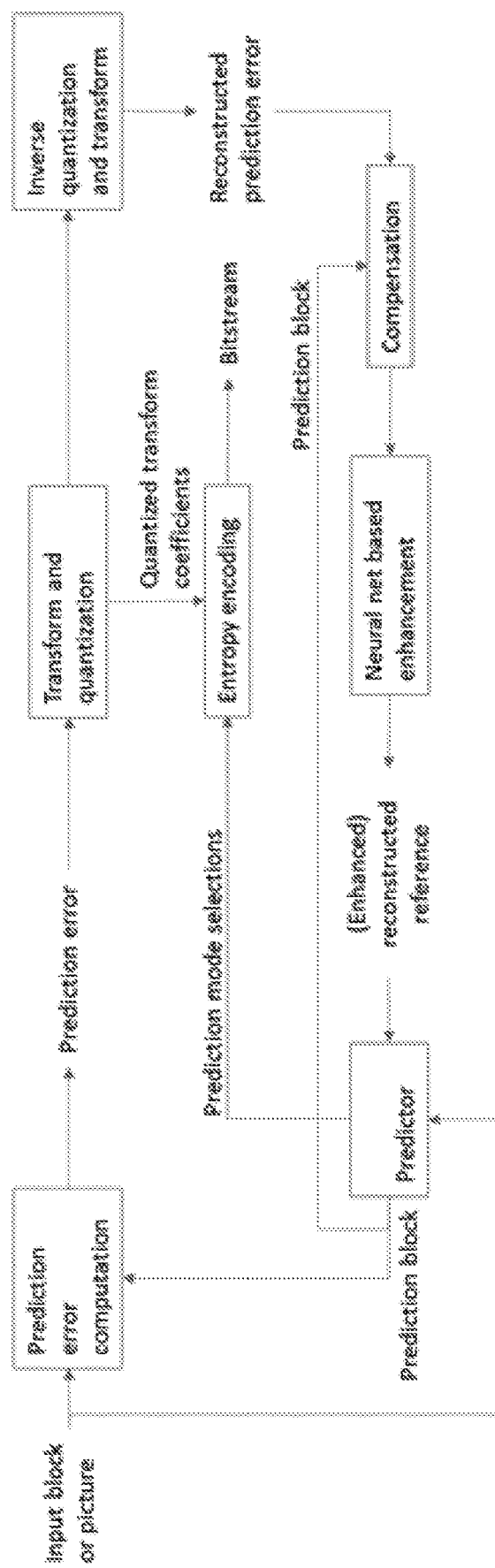

FIG. 9e illustrates the operation of an encoder for blocks/pictures selected to be enhanced by the neural net that outputs an enhanced reconstructed block/picture. Compared to the encoder of FIG. 9b, the encoder of FIG. 9e implements only one quantization step, wherein the quantization parameter value or the quantization step size in "Transform and quantization" is "coarse". Otherwise, the steps operate similarly to those explained previously.

Encoding a Block/Picture that is Enhanced with the Neural Net (Option 4)

Figure 9F:
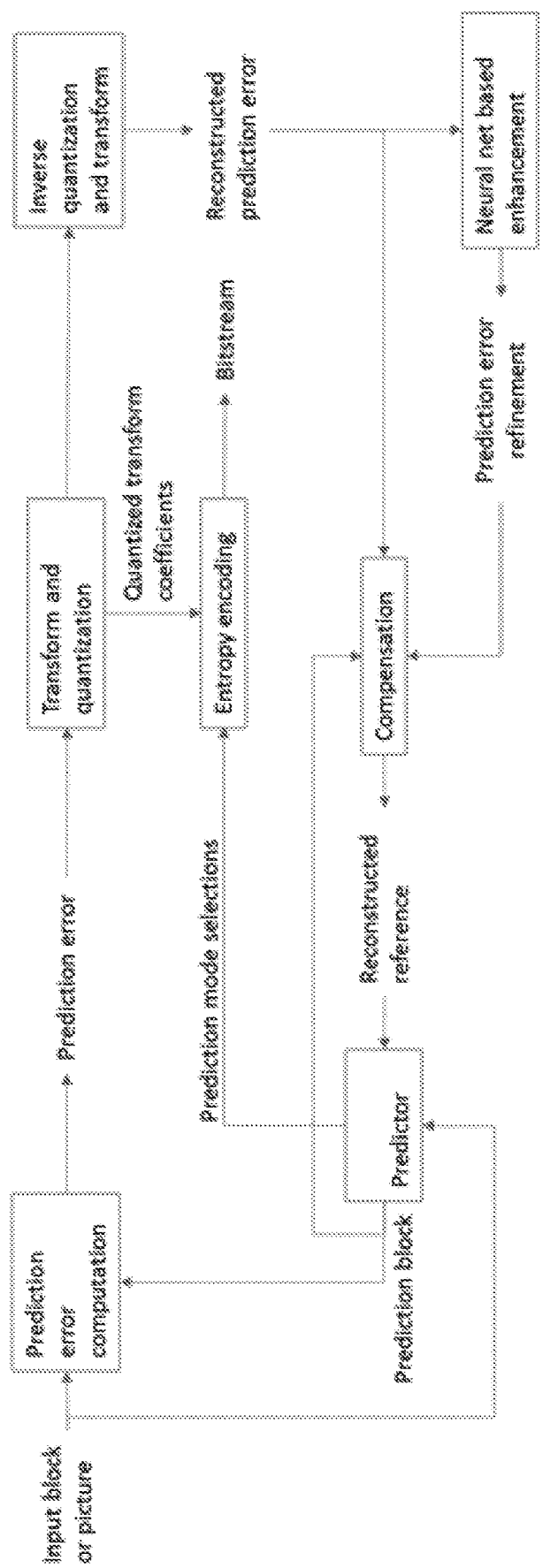

FIG. 9f illustrates the operation of an encoder for blocks/pictures selected to be enhanced by the neural net that outputs an enhanced reconstructed block/picture. The encoder of FIG. 9f implements only one quantization step, wherein the quantization parameter value or the quantization step size is "coarse". It is noted that the compensation step essentially sums up sample-wise the prediction block, the reconstructed prediction error block, and the prediction error refinement block.

Due to the nature of neural networks, a video/image decoder according to an aspect of the invention comprises partly similar units as the video/image encoder, and at least part of the similar units operate identically to the corresponding units in the video/image encoder.

Decoding a Block/Picture that is Used as Source for On-Line Learning (Option 1)

Figure 10:
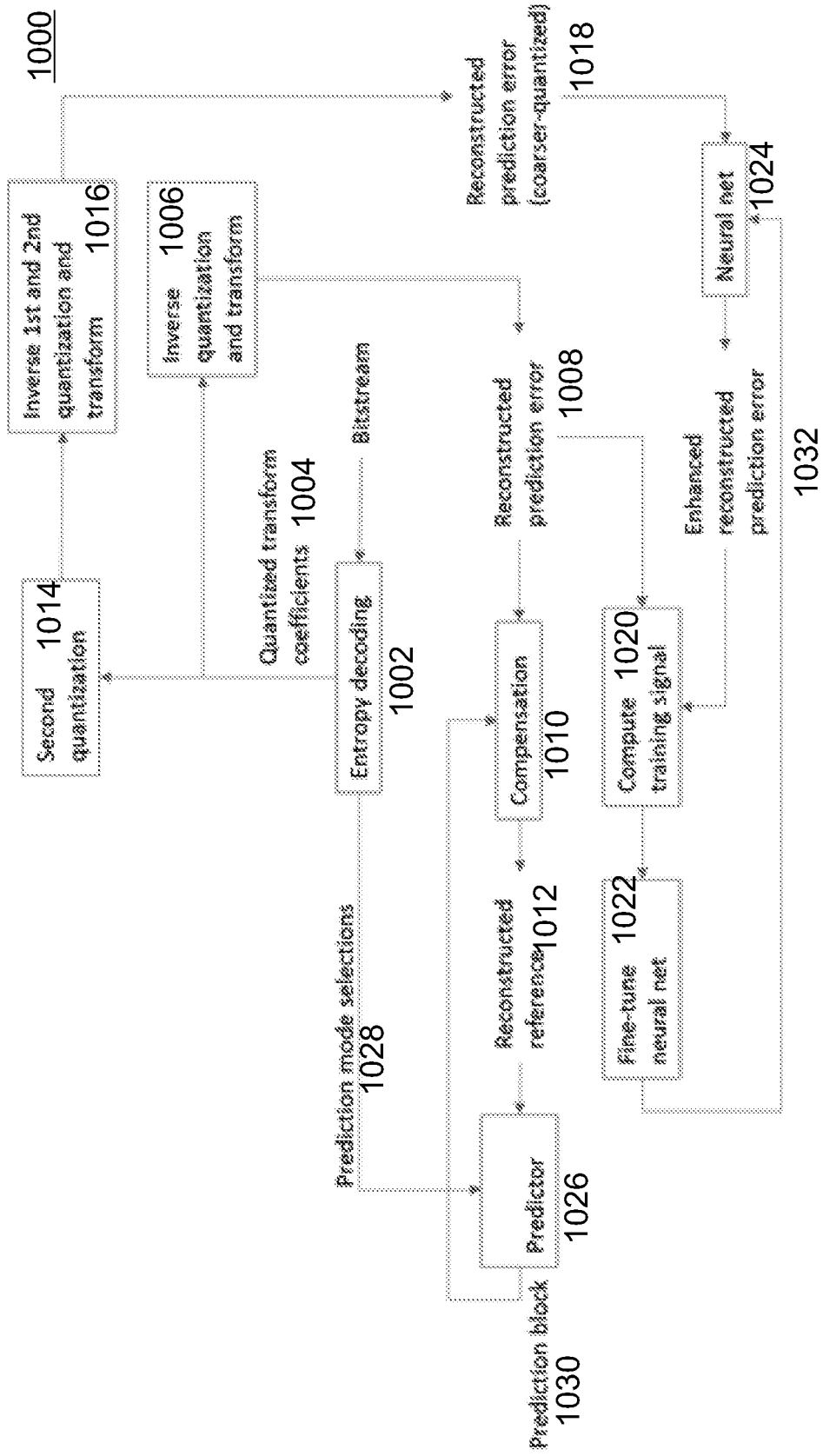
FIG. 10 shows a schematic diagram of a decoder suitable for implementing embodiments of the invention.

FIG. 10 depicts a video/image decoder 1000 according to an aspect of the invention. The coding parameters for an encoded version of the prediction error are entropy-decoded 1002 from the bitstream. For example, the quantized transform coefficients 1004 may be entropy-decoded from the bitstream.

The first inverse quantization and transform unit 1006 (i.e., generally the prediction error decoding), generating the reconstructed prediction error 1008, and the compensation process 1010 may be respectively identical to those in the encoder of FIG. 8. A reconstructed reference block 1012 may be also used as the output of the decoder, or may be further processed e.g. by filtering (e.g. deblocking and/or sample adaptive offset filtering) and/or cropping. Likewise, the second quantization step 1014 and the second inverse quantization and transform unit 1016 may operate similarly to the encoder of FIG. 8 to form the reconstructed prediction error 1018. Also, the processes of computing the training signal 1020 and fine-tuning the neural net 1022 may be respectively identical to those in the encoder. Consequently, the encoder and the decoder fine-tune the neural net 1024 identically.

The predictor 1026 in the decoder obtains prediction mode selections 1028 from the entropy decoder (and typically does not comprise a search for prediction mode parameters, like the encoder-side predictor might have). Otherwise, the predictor 1026 operates similarly to that in the encoder, i.e. produces prediction blocks 1030 on the basis of the reconstructed reference signal 1012.

Decoding of a block/picture that is used as source for on-line learning for options 2 to 4 can be realized similarly to that of option 1 by incorporating the encoder-side steps to the decoder side.

Herein, the decoder should be interpreted to cover any operational unit capable to carry out the decoding operations, such as a player, a receiver, a gateway, a demultiplexer and/or a decoder.

Decoding a Block/Picture that is Enhanced with the Neural Net (Option 1 and 2)

Figure 11:
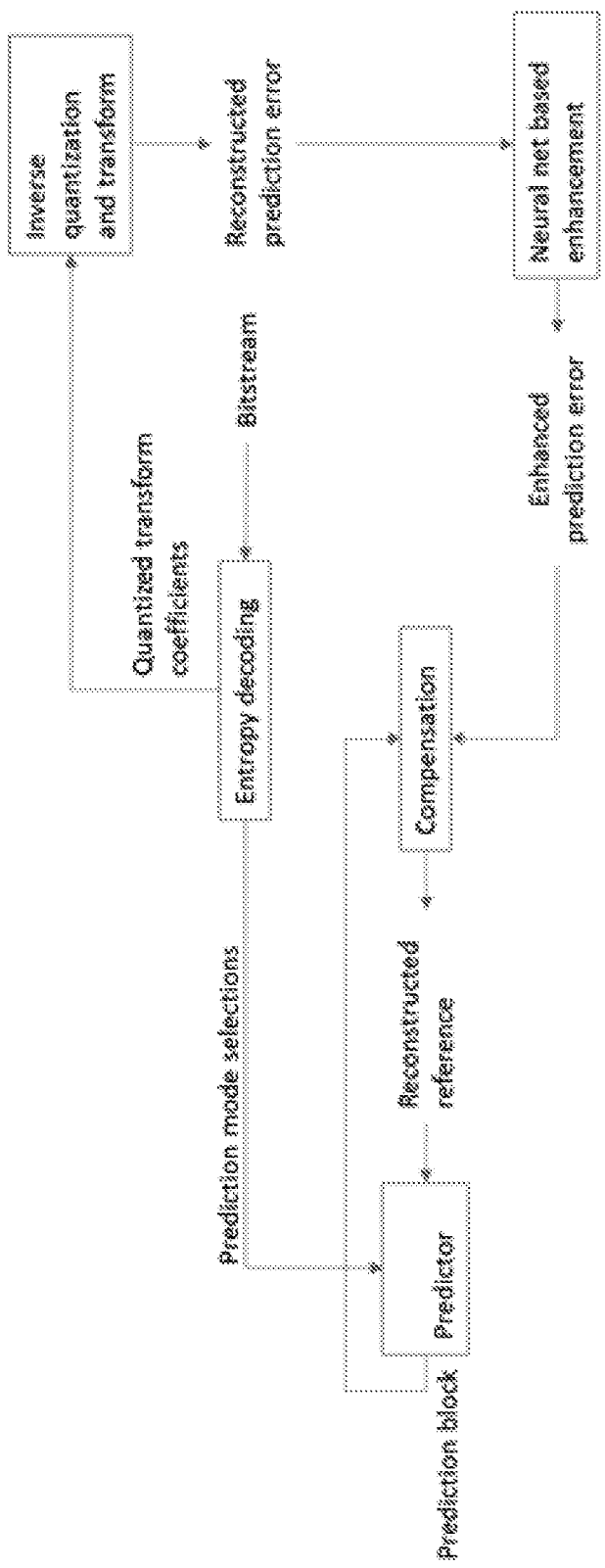
FIG. 11 shows a schematic diagram of another decoder suitable for implementing embodiments of the invention

FIG. 11 illustrates the operation of a decoder for blocks/pictures selected to be enhanced by the neural net that outputs an enhanced reconstructed prediction error block/picture, wherein only one quantization step is implemented. The steps operate similarly to those explained previously.

The embodiments described above utilize NN-based enhancement within the (de)coding loop to enhance the quality of the reference blocks/pictures used as sources for predicting subsequent blocks/pictures in (de)coding order. The embodiments may be realized in a manner where NN-based enhancement is performed outside the (de)coding loop to improve the quality of output pictures while keeping the reference pictures reconstructed conventionally. The phrase outside the (de)coding loop is used herein to mean that the NN-enhanced reconstructed pictures are not used as reference or source for predicting subsequent video data. With such an approach the encoder/decoder according to the embodiments may be plugged with any existing codec. An encoder for blocks/pictures contributing to NN fine-tuning according to option 1 and suitable for out-of-the-loop operation is illustrated in FIG. 8 and described above. Other options may be applied similarly and are likewise explained above. A decoder for blocks/pictures contributing to NN fine-tuning according to option 1 suitable for out-of-the-loop operation is illustrated in FIG. 10 and described above. Other options may be applied similarly and are likewise explained above. Example encoder and decoder structures for blocks/pictures subject to NN-enhancement according to option 1 with reference to FIGS. 12a and 12b are given below, while it needs to be understood that similar encoder and decoder structures could be realized for the other options too.

Encoding and decoding a block/picture that is used as source for on-line learning may be performed identically to how they are done in the above-described embodiments.

Figure 12A:
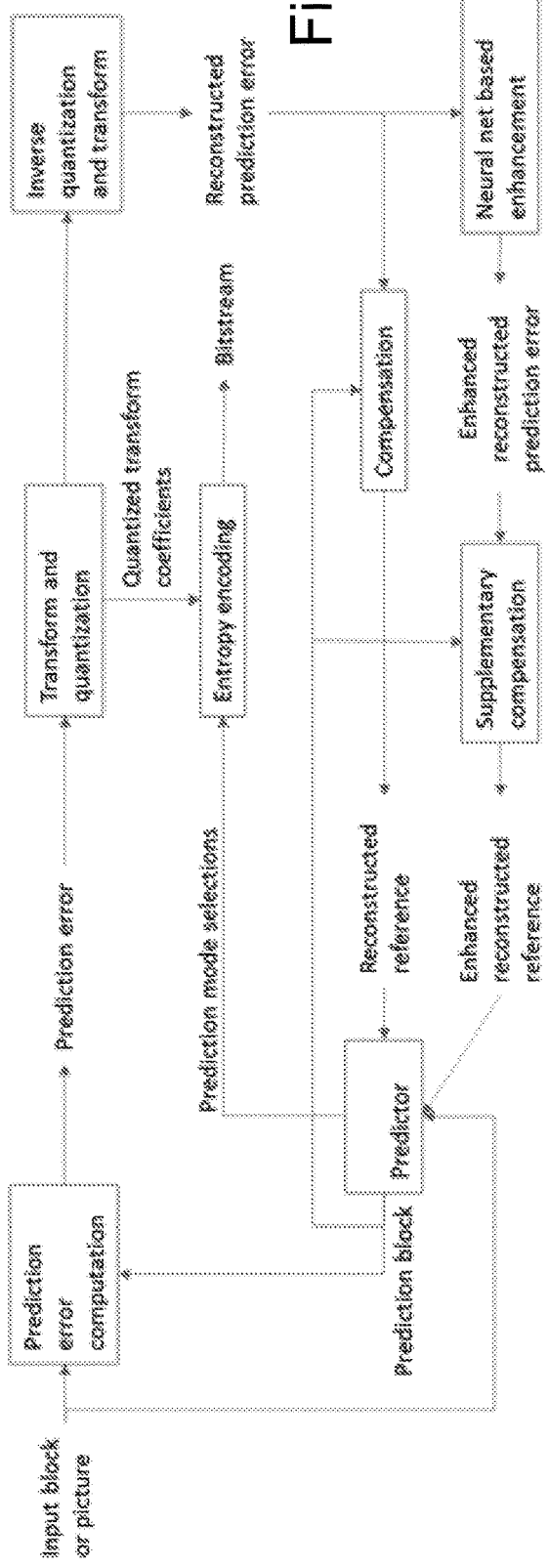
FIGS. 12a and 12b illustrate the operation of an encoder and a decoder for blocks/pictures selected to be enhanced by the neural net.
Figure 12B:
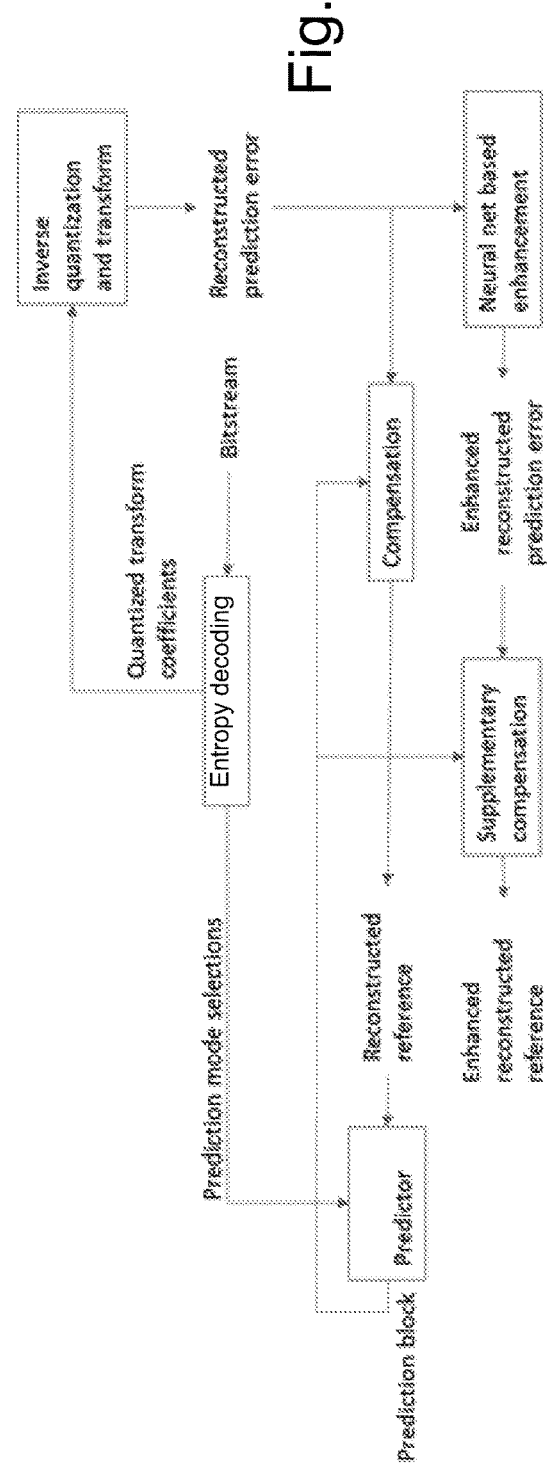

FIG. 12a illustrates the operation of an encoder for blocks/pictures selected to be enhanced by the neural net that outputs an enhanced reconstructed prediction error block/picture (options 1 and 2). The steps operate similarly to those explained previously. It is noted that:

In an embodiment, the predictor inputs enhanced reconstructed reference e.g. for determining prediction modes. With this approach, the NN-based enhancement is taken into account in selecting encoding parameters, such as picture rate, spatial resolution, quantization parameter, and prediction modes, e.g. in a rate-distortion optimized way. The predictor does not use the enhanced reconstructed reference as a source for the prediction block itself. With this embodiment it is likely that the quality of NN-enhanced frames improves over time, which could be compensated by reducing the encoded bitrate/quality. The same spatiotemporal unit may be encoded multiple times each with different encoding parameters and NN-enhanced. From the resulting reconstructed pictures, those that provide a desired rate-distortion trade-off may be selected to be included in the bitstream. Only this selected encoding is used as input in overfitting the NN that is maintained in both the encoder and the decoder.

If the predictor does not use the enhanced reconstructed reference as input, the "Neural net based enhancement" and "Supplementary compensation" steps may be removed, in which case the encoding operation is conventional.

The two compensation blocks may operate similarly or identically to each other, with different inputs and outputs though.

FIG. 12b illustrates the operation of a decoder, corresponding to the encoder of FIG. 12a, for blocks/pictures selected to be enhanced by the neural net that outputs an enhanced reconstructed prediction error block/picture. The steps operate similarly to those explained previously.

The encoder may assess e.g. block-wise if the enhanced reconstructed reference improves the quality over reconstructed reference, e.g. by comparing each of them to the respective input block/picture. The encoder may indicate, e.g. with a block-wise indication, in or along the bitstream whether the decoder should output the reconstructed reference or enhanced reconstructed reference. The block-wise indication may be encoded with context-based entropy coding (see below). The indication(s) may for example be represented by an SEI message. The decoder may decode the indication(s) from or along the bitstream. The decoder or a displaying/rendering process, may selectively output the reconstructed reference or the enhanced reconstructed reference based on the decoded indication(s).

According to an embodiment, the neural net based enhancement is used to replace selected final steps of the reconstruction process, which may comprise filtering steps, such as deblocking loop filtering and/or sample adaptive offset filtering. This may be realized according to different embodiments, for example as follows:

In the encoding of a block/picture that is used as source for on-line learning for option 1, the "Compute training signal" process additionally inputs the reconstructed reference and the prediction block/picture, and may exclude the input of reconstructed prediction error. The reconstructed reference is assumed to have undergone the filtering steps. A prediction delta block is computed as the sample-wise difference of the reconstructed reference and the prediction block. A loss is derived as the difference of the prediction delta block and the enhanced reconstructed prediction error. The loss is used as the gradient for fine-tuning the neural net.

In the encoding of a block/picture that is used as source for on-line learning (option 2 and 3), the "Supplementary compensation" process excludes the selected final steps of the reconstruction process.

In the encoding of a block/picture that is enhanced with the neural net (option 1, 2, and 3), the "Compensation" process excludes the selected final steps of the reconstruction process.

According to an embodiment, the online training is performed using reconstructed prediction error from intra-coded pictures (for example from IRAP pictures) or blocks, and the neural network is used for enhancing the reconstructed prediction error from inter-predicted pictures (such as P, B pictures) and or blocks.

However, the reconstructed prediction error of intra-coded pictures or blocks may have different data distribution than the reconstructed prediction error of inter-predicted pictures or blocks. This is because the prediction process is substantially different. For example, error in intra-prediction may come from errors in spatial extrapolation of intra-coded blocks, whereas error in inter-prediction may come from errors in motion compensation of inter-coded blocks.

Training a neural net on a certain data domain (i.e., data with a certain probability distribution) and using the trained neural net on another data domain (i.e., data with a similar but different probability distribution) is referred to as "domain shift" in machine learning literature. One typical example of domain shift is when training on synthetic images and using the network on natural images. The domain shift may result in lower performance of the neural network with respect to doing inference on the same domain as the one used for training. The domain on which a neural net is trained is usually referred to as source domain, whereas the domain on which a neural net is used is usually referred to as target domain or destination domain.

In addition, similar domain shift issues may appear in the following cases:
- The prediction mode differs between blocks used for training and blocks being enhanced. For example, one block uses a DC intra prediction mode of intra prediction and the other uses an angular intra prediction mode.
- In some coding schemes, independently coded pictures (e.g. IRAP) may contain blocks that use intra block copy prediction, for which the distribution of the residual signal may differ from the distribution of intra-coded blocks.
- Inter-coded pictures/blocks may be either uni-predicted (P) or bi-predicted (B)

One straightforward way to cope with the domain shift issue is to use pictures/blocks of the same type (intra or inter) and, in some embodiments, of the same "subtype" (e.g. P or B), for training and enhancing. According to an embodiment, several neural nets, each per different coding type and subtype, are pre-trained, fine-tuned, and used for inference according to other embodiments. Further implementation details relating to several sets of parameters and/or weights for the neural net are described further below.

To overcome the domain shift issue, an online domain adaptation process may be used. This may be implemented by transfer learning, i.e., by using a neural network previously trained (or "pre-trained") on a source domain and fine-tuning it (i.e., further training it) on a target domain. Fine-tuning may be performed by continuing training the neural network on the target domain starting from weights trained at one of the previous training sessions on source domains. In order not to "destroy" or lose too much of the information previously acquired during training on the source domain, a low learning rate may be adopted for updating the weights of the neural net. For example, the learning rate may be ten times lower than the one used during pre-training on the source domain.

In the following, an example embodiment is described with reference to intra-coded and inter-coded blocks and to codec structure according to option 1 or 2. It needs to be understood that the example embodiment could be similarly realized for other prediction/block types and/or sub-types, and/or other presented codec structure options. In the embodiment, the domain adaptation by transfer learning is implemented in the online setting by alternately performing the following operations:
- Online pre-training on the source domain. The input to the neural network is the coarser quantized prediction error of intra-coded pictures or blocks, and the target output is the finer quantized prediction error of intra-coded pictures or blocks. This may be performed for a certain number of intra-coded pictures or blocks, and results in very low additional bandwidth due to the additional coarser quantized prediction error that the encoder needs to send to the decoder.
- Online fine-tuning on the target domain. The input to the neural network is the coarser quantized prediction error of inter-coded pictures or blocks, and the target output is the finer quantized prediction error of inter-coded pictures or blocks. This may be performed only for one or few inter-coded pictures or blocks, and results in a bit higher additional bandwidth than the online pre-training because the encoder needs to send the finer quantized prediction error also for inter-coded pictures or blocks.

When the neural network is applied to enhance the reconstructed prediction error of inter-coded pictures or blocks, the encoder and decoder need to decide which version of the neural network's weights to use. In an embodiment, the weights resulting from the latest fine-tuning process on the target domain are used.

Figure 13:
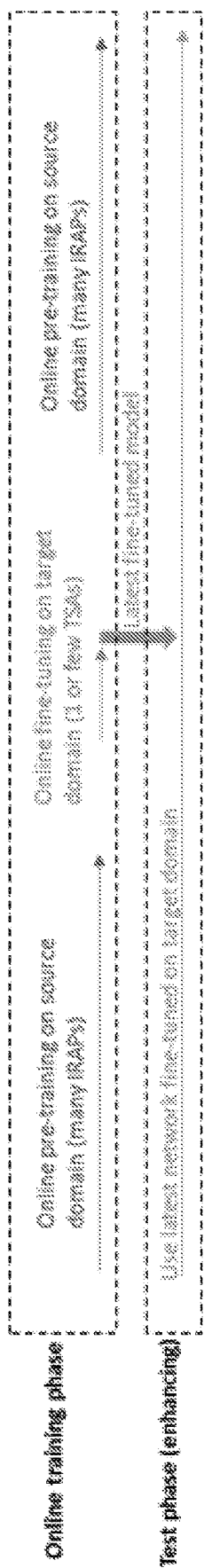
FIG. 13 shows an example of online domain adaptation according to an embodiment.

FIG. 13 provides a pictorial illustration of the proposed online domain adaptation. Using instead the latest version of the weights may result in using weights tuned by the online pre-training step. Such weights may not be optimal for the target domain, as they may result into a network whose state has diverged from a certain local minimum for the target domain to another local minimum which may be better for the source domain but worse for the target domain. In other words, if at current time the latest neural net has gone through many iterations of the online pre-training using intra-coded pictures or blocks, the weights may have shifted too much towards the source domain. Therefore, it may be safer to not use such latest version and use instead the latest fine-tuned version (fine-tuned on the target domain). While FIG. 13 refers to particular types of pictures (IRAP, TSA), it needs to be understood that FIG. 13 applies more generally to other categorizations of pictures/blocks. For example, FIG. 13 could apply to any intra-coded pictures (not only IRAP) and to any inter-coded pictures (not just TSA).

A common practice in multiview coding is to have quality difference (e.g. quantization parameter difference, or asymmetric spatial resolution) between views. It has been studied that human visual system masks the difference quite effectively.

According to an embodiment, pictures of the view(s) with higher fidelity are used as pictures contributing to the NN fine tuning, while pictures of the view(s) with lower fidelity are enhanced by the NN.

Some embodiments relating to usage of scalable video coding in the encoders/decoders according to the embodiments are described in the following. The embodiments are described with reference to two-layer scalable video coding with a base layer and an enhancement layer that is predicted from the base layer. However, it needs to be understood that the embodiment could similarly be applied to scalable video coding with more than two layers.

According to an embodiment, the neural net is used for enhancing the base layer pictures along any of the options 1 to 4 presented previously. The enhancement-layer pictures are used as pictures contributing to the NN fine tuning According to an embodiment applied in-loop in the encoder and/or the decoder, double buffering of neural net parameters/weights is utilized. Within a set of pictures consisting of base-layer pictures and the respective enhancement-layer pictures (within the same access units as the base-layer pictures or time-aligned with the base-layer pictures), the encoder uses a first set of NN parameters/weights for enhancing the base-layer pictures and fine-tunes a second set of NN parameters/weights using the enhancement-layer pictures. A decoder decoding the encoded bitstream provides feedback to the encoder whether it decoded all the enhancement-layer pictures of the set of pictures. Provided that the feedback indicates that all the enhancement-layer pictures are decoded, the encoder switches to use the second set of parameters/weights for enhancing base-layer pictures (in a subsequent set of pictures) and creates a separate copy of the second set of parameters/weights that is being further fine-tuned using subsequent enhancement-layer pictures. If the feedback indicates that some enhancement-layer pictures were not decoded, the encoder resets the second set of parameters/weights to be equal to those in the first set and restarts the fine-tuning process using subsequent enhancement-layer pictures. Embodiments relating to double buffering are disclosed further below.

According to an embodiment applied out-of-the-loop, the decoder uses the received and correctly decoded enhancement-layer pictures as source for NN fine-tuning. When the enhancement layer is not received (e.g. due to bitrate adaptation or transmission losses) or decoded (correctly or at all), the neural net is used to enhance base-layer pictures (that do not have a corresponding correctly decoded enhancement-layer picture available).

In order not to "destroy" the information learnt in previous training iterations or during the initial learning, the online learning may use a sufficiently low learning-rate. The learning rate may be determined by the encoder and indicated in or along the bitstream to the decoder.

According to an embodiment, an encoder adaptively turns learning on or off (and indicates that to the decoder) in a dynamic manner. In the case the encoder detects or expects that online training for a certain frame/slice/unit is not beneficial, it can turn the learning off and indicate the decision in or along the bitstream to the decoder. For example, a shot boundary may cause a very high prediction error, which could in turn destroy most information learned so far by the neural net. A different implementation of the same concept may consist of detecting such cases both at encoder and decoder (instead of detecting at encoder's side and then indicating to the decoder), in order to make encoder and decoder more independent. In an additional embodiment, instead of turning off the learning completely, the learning process is made less impactful on the weights of the neural net, by decreasing the learning rate further. Thus, the content is analyzed in order to adapt the extent of fine-tuning the neural nets. The encoder may indicate, in or along the bitstream, one or more parameters (and/or their values) controlling the effectiveness of the on-line learning to the parameters or weights of the neural net. The decoder may respectively decode, from or along the bitstream, one or more parameters (and/or their values) controlling the effectiveness of the on-line learning to the parameters and/or weights of the neural net. Alternatively, the encoder and the decoder may conclude one or more parameters (and/or their values), e.g. based on scene cut detection.

According to an embodiment, the inputs to the training signal computation and/or the neural net fine-tuning are analyzed and the learning process can be adjusted or turned off based on the characteristics of the inputs. For example, in option 1, training based on the average difference of the reconstructed prediction error and the enhanced reconstructed prediction error being smaller than a threshold might be omitted.

According to an embodiment, the set of parameters and/or weights for the neural net is reset to the initial set at a random access point, such as at an IRAP picture (with nuh_layer_id equal to 0) in HEVC or alike. In encoding and/or decoding, this resetting operation may be inferred from certain picture types or alike, such as the nal_unit_type in HEVC indicating an IRAP picture.

According to an embodiment, the encoder may encode, in or along the bitstream, an indication that set of parameters and/or weights for the neural net is reset to the initial set. The encoder may determine to reset the set of parameters and/or weights to the initial for example when the encoded content is expected or detected to differ remarkably from that encoded earlier (e.g. a different camera is connected to the encoder, or the camera connected to the encoder is moved or turned to a remarkably different location or orientation). The decoder may decode, from or along the bitstream, an indication that set of parameters and/or weights for the neural net is reset to the initial set, and act accordingly.

According to an embodiment, a cache of fine-tuning data samples are kept and the fine-tuning stage utilizes all samples from this cache, and not just the latest ones. This may improve the fine-tuning results, because of the nature of stochastic gradient descent.

In an embodiment, which may be applied independently of or together with other embodiments, in addition to the initial sets of parameters and/or weights for the neural net, the encoder and/or the decoder may maintain several sets of parameters and/or weights for the neural net according to one or more of the following:

Sets of parameters and/or weights depending on the prediction type and/or prediction reference type: A distinct set of parameters and/or weights may be maintained for each type of prediction. For example, one neural net may be maintained for intra-coded blocks and another neural net may be maintained for inter-coded blocks. Since the properties of the prediction error may depend significantly on whether a block is intra or inter coded, it may be appropriate to have separate networks for intra-coded and inter-coded blocks, or to use the method for only either intra-coded or inter-coded blocks.

Multiple fidelity levels: There may be more than two quantization steps or the coarse quantization may be done with different level of coarseness for different blocks (to train the model for varying differences in base QP and QPs used in enhanced frames). As an additional embodiment to this multiple quantization steps embodiment, the quantization step is input to the neural network by first converting it into a one-hot representation, and then using one or more fully-connected layers, whose output is finally concatenated to the reconstructed residual error. The concatenated tensor is then input to the neural net.

Competing sets of parameters and/or weights: The sets of parameters and/or weights may be trained with different online learning rate and/or method.

Layer-wise parameters and/or weights: A distinct set of parameters and/or weights may be maintained per each layer of a multi-layer bitstream.

Sub-layer-wise parameters and/or weights: A distinct set of parameters and/or weights may be maintained per each temporal sub-layer of the bitstream.

Slice-type-wise parameters and/or weights: A distinct set of parameters and/or weights may be maintained per picture or slice type, e.g. one set for intra slices, and another set for inter (P or B) slices.

Color-component-wise parameters and/or weights: A distinct set of parameters and/or weights may be maintained for luma and both chroma components collectively, or for luma and each chroma component separately.

In addition to maintaining several sets of parameters and/or weights, the type of the neural network may differ for one or more of the cases listed in the bullet list above. For example, a convolutional neural net may be used for certain prediction modes, such as intra prediction, while a recurrent neural net may be used for certain other prediction modes, such as inter prediction.

It may be considered that parameters identified in the above list, such as the chosen prediction mode and related parameters, such as block partitioning, are provided as inputs to "fine-tune neural net" module in association with the computed training signal.

Some of the above parameter categories are discussed below in more detail.

Competing Sets of Parameters and/or Weights for the Neural Net

Multiple models can be trained by the encoder and/or the decoder using the same encoded prediction error as basis for the training signal used for online training. The models can differ for example in one or more of the following ways:

Different online learning rate may be used.

Different training method may be used.

Different derivation of training signal from the encoded prediction error and/or the reconstructed prediction error may be used.

According to an embodiment, the encoder may include in or along the bitstream an indication which set of parameters and/or weights is in use for a particular piece of the bitstream, such as for a particular coded video sequence, a particular picture, or a particular slice. The decoder may decode, from or along the bitstream, an indication which set of parameters and/or weights is in use for a particular piece of the bitstream.

According to an embodiment, the encoder and the decoder may conclude, using certain rules or algorithm, which set of parameters and/or weights is in use for a particular piece of the bitstream. The rules or the algorithm may be pre-defined for example in a video/image coding standard, or may be included, by an encoder, in or along the bitstream, e.g. using a scripting language, and decoded, by a decoder, from or along the bitstream.

According to an embodiment, the encoder can determine to discard a set of parameters and/or weights or reset a set of parameters and/or weights to be equal to an initial set of parameters and/or weights or another maintained set of parameters and/or weights. The encoder can indicate such discarding or resetting operation in or along the bitstream, and the decoder decode from or along the bitstream an indication of such discarding or resetting operation and act accordingly.

Layer-Wise Parameters and/or Weights for the Neural Net

Several sets of parameters and/or weights are maintained, one for each layer of a multi-layer video bitstream, in one of the following ways:

The set of parameters and/or weights for a particular layer of a multi-layer video bitstream is trained on the basis of the pictures belonging to that layer.

The set of parameters and/or weights for a particular layer is trained on the basis of the pictures belonging to that layer or to any direct or indirect reference layer of that layer.

Consequently, the inherent property of being able to prune layers from a multi-layer bitstream is maintained.

In order to enable layer up-switching, i.e. decoding of a layer at a position that is not at the start of the bitstream, the encoder and/or the decoder may operate in one of the following ways. The way to operate may be pre-defined e.g. in a coding standard, may be encoded in or along the bitstream and/or decoded from or along the bitstream, or may be concluded by the encoder and the decoder using certain rules or algorithm (which may be pre-defined or indicated in or along the bitstream).

For a layer up-switch picture (e.g. for an IRAP picture in HEVC) on a predicted layer, the parameters and/or weights are reset to those of a direct reference layer. If there are multiple direct reference layers, it may be pre-defined, e.g. in a coding standard, which direct reference layer is used in such resetting, e.g. the direct reference layer having the closest layer identifier value relative to the layer containing the up-switch picture. Alternatively, the encoder may indicate in or along the bitstream which direct reference layer is used as a source for the set of neural net parameters and/or weights, and likewise the decoder may decode from or along the bitstream which direct reference layer is used as a source for the set of neural net parameters and/or weights.

For a layer up-switch or initialization picture (e.g. for an IRAP picture in HEVC), the parameters and/or weights are reset to those in the initial set of parameters and/or weights.

Sub-Layer-Wise Parameters and/or Weights for the Neural Net

Several sets of parameters and/or weights are maintained, one per each sub-layer, in one of the following ways:

The set of parameters and/or weights for a particular sub-layer is trained on the basis of the pictures belonging to that sub-layer.

The set of parameters and/or weights for a particular layer is trained on the basis of the pictures belonging to that sub-layer or to any lower sub-layer (on which the current sub-layer may depend).

Consequently, the inherent property of being able to prune sub-layers from a temporally scalable bitstream is maintained.

In order to enable sub-layer up-switching, i.e. starting the decoding of a sub-layer at a position that is not at the start of the coded video sequence, the encoder and/or the decoder may operate in one of the following ways. The way to operate may be pre-defined e.g. in a coding standard, may be encoded in or along the bitstream and/or decoded from or along the bitstream, or may be concluded by the encoder and the decoder using certain rules or algorithm (which may be pre-defined or indicated in or along the bitstream).

For a sub-layer up-switch picture (e.g. for a TSA or STSA picture in HEVC), the parameters and/or weights are reset to those of the immediately lower sub-layer. For example, in HEVC based coding or alike, for a TSA or STSA picture with Temporand equal to T (greater than 0), the parameters and/or weights are reset to those of TemporalId equal to T−1.

For a sub-layer up-switch (e.g. for a TSA or STSA picture in HEVC), the parameters and/or weights are reset to those in the initial set of parameters and/or weights.

Regarding any of the above sets of parameters and/or weights, two (double) sets of parameters and/or weights for the neural net may be maintained by an encoder and/or a decoder. Both sets of parameters and/or weights are initially reset to the initial set of parameters and/or weights, e.g. at the start of a coded video sequence or a bitstream. The first set of parameters and/or weights is used for encoding and/or decoding a first picture. The first picture is used in online training of the second set of parameters and/or weights. The training signal is input to online training using a certain order, such as in decoding order of blocks corresponding to the training signal (when single-thread decoding is in use), which may be pre-defined e.g. in a coding standard, or may be indicated by an encoder in or along the bitstream and/or decoded by a decoder from or along the bitstream. After the encoding or decoding of the first picture, or at a start of encoding or decoding a second picture, the first set of parameters and/or weights are set equal to the second set of parameters and/or weights, and the second picture is then encoded or decoded similarly to the first picture.

The first set of parameters and/or weights that is maintained and updated this way may be referred to as per-picture-refreshed set of parameters and/or weights.

It is remarked that the encoder typically inspects different prediction modes and coding parameters e.g. in a rate-distortion optimized mode selection. As part of such encoding operation, parts of the encoder in FIG. 8 may be executed multiple times. Some encoders may perform two-pass encoding in a manner that several blocks, e.g. an entire picture, is encoded at a first pass, the results of the first pass are analyzed to perform more optimal encoding mode decisions in the second. In such two-pass encoding more than one set of parameters and/or weights may need to be maintained, such that the parameters and/or weights that apply for decoding are equal to those that apply at the start of second-pass encoding.

Such double buffering may be used as a basic method for enabling parallel processing that may e.g. be based on processing slices, tiles, and/or wavefronts in parallel. Thanks to using the same (first) set of parameters and/or weights consistently for an entire picture, the parallel processing units (e.g. slices, tiles, and/or wavefronts) of the picture can be processed at any order.

According to an embodiment, the neural net fine tuning is performed subsequently to encoding or decoding an entire picture that is used as source for on-line learning. Consequently, the encoding or decoding order of slices, tile, and/or wavefronts does not affect the fine-tuning.

Capability-Driven Operation

The method to derive the training hyper-parameters may be negotiated or orchestrated based on minimum available computational resources (or based on other capabilities) of an encoder or a decoder or the device(s) or system(s) executing the functions of an encoder or a decoder. Such negotiation or orchestration may be a feasible approach for example in a real-time conversational application.

According to an embodiment, a negotiation or orchestration may happen at a start of a session. As a result the encoder and the decoder use the same model of the neural net, the same online training method, and the same method for deriving the hyper-parameters for online training. For example, a decoder may indicate to the encoder which neural net model and/or which online training method and/or which method for deriving training hyper-parameters is to be used. The possible alternatives neural net models and/or online training methods and/or methods for deriving training hyper-parameters may be pre-defined and enumerated, and hence the negotiation or orchestration may be performed based on such pre-defined and enumerated lists of models or methods.

According to an embodiment, a negotiation may be re-established during a session, e.g. if computational resources of an encoder or a decoder change.

In the above, the embodiments are described as block-wise operations, but it needs to be understood that all or a subset of the operations could be performed for other units, such as entire picture(s) or individual pixels. Therefore, it is further noted that the blocks, such as the input block, prediction block, prediction error block and reconstructed prediction error block, may as well be referred to both in the description and in the claims as signals, such as input signal, prediction signal, prediction error signal and reconstructed prediction error signal.

Figure 14:
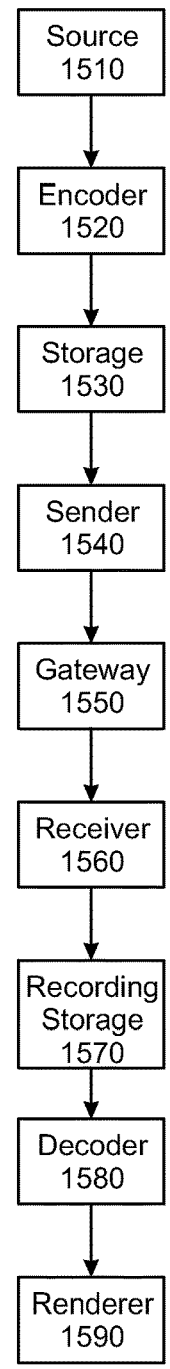
FIG. 14 shows a schematic diagram of an example multimedia communication system within which various embodiments may be implemented.

FIG. 14 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
   obtaining a block of a picture or a picture in an encoder;
   determining when the block or picture is used for on-line learning;
   when affirmative, encoding the block or picture;
      reconstructing a coarse version of the block or picture or a respective prediction error block or picture;
      enhancing the coarse version using a neural net; and
      fine-tuning the neural net with a training signal based at least on the coarse version;

encoding, responsive to the block or picture not being used for on-line learning, the block or picture;

wherein reconstructing the respective prediction error block or picture forms a reconstructed prediction error block or picture;

wherein encoding the block or picture comprises predicting the block or picture to form a prediction block or picture; and using the neural net for enhancing the reconstructed prediction error block or picture prior to reconstructing the block or picture with summing up the respective prediction block or picture and the respective prediction error block or picture.

2. The method according to claim 1, further comprising reconstructing the block or picture or the respective prediction error block or picture; and fine-tuning the neural net with the training signal based on the reconstructed block or picture or the respective reconstructed prediction error block or picture and on the coarse version.

3. The method according to claim 1, wherein said reconstructing the coarse version comprises:

re-quantizing reconstructed transform coefficients of the respective prediction error block or picture; and reconstructing the respective coarse prediction error block or picture.

4. The method apparatus according to claim 1, further comprising deriving the training signal based at least on a gradient of a loss, where the loss is represented with:

a difference of a reconstructed prediction error and a neural net enhanced reconstructed prediction error, where the enhancement is applied to a coarser-quantized reconstructed prediction error; or a difference of a reconstructed reference block or picture and a neural network enhanced reconstructed reference block or picture, where the enhancement is applied to a coarser-quantized reconstructed prediction error.

5. A method comprising:

obtaining an encoded block of a picture or an encoded picture in a decoder;

determining when the block or picture is used for on-line learning;

when affirmative, decoding the block or picture;

reconstructing a coarse version of the block or picture or a respective prediction error block or picture;

enhancing the coarse version using a neural net; and fine-tuning the neural net with a training signal based at least on the coarse version;

decoding, responsive to the block or picture not being used for on-line learning, the block or picture;

wherein reconstructing the respective prediction error block or picture forms a reconstructed prediction error block or picture;

wherein decoding the block or picture comprises predicting the block or picture to form a prediction block or picture; and using the neural net for enhancing the reconstructed prediction error block or picture prior to reconstructing the block or picture with summing up the respective prediction block or picture and the respective prediction error block or picture.

6. The method according to claim 5, further comprising: reconstructing the block or picture or the respective prediction error block or picture; and fine-tuning the neural net with the training signal based on the reconstructed block or picture or the respective reconstructed prediction error block or picture and on the coarse version.

7. The method according to claim 5, wherein said reconstructing the coarse version comprises:

re-quantizing reconstructed transform coefficients of the respective prediction error block or picture; and reconstructing the respective coarse prediction error block or picture.

8. The method of claim 5, wherein online learning comprises learning at least one parameter of the neural net continuously on a stream of data.

9. The method according to claim 5, further comprising deriving the training signal based at least on a gradient of a loss, where the loss is represented with:

a difference of a reconstructed prediction error and a neural net enhanced reconstructed prediction error, where the enhancement is applied to a coarser-quantized reconstructed prediction error; or a difference of a reconstructed reference block or picture and a neural network enhanced reconstructed reference block or picture, where the enhancement is applied to a coarser-quantized reconstructed prediction error.

10. An apparatus comprising:

at least one processor; and at least one non-transitory memory including computer program code;

the at least one memory and the computer program code configured to, with the at least one processor, cause the apparatus at least to perform:

obtain a block of a picture or a picture in an encoder;

determine when the block or picture is used for on-line learning;

when affirmative, encode the block or picture;

reconstruct a coarse version of the block or picture or a respective prediction error block or picture;

enhance the coarse version using a neural net; and fine-tune the neural net with a training signal based at least on the coarse version;

encode, responsive to the block or picture not being used for on-line learning, the block or picture;

wherein reconstructing the respective prediction error block or picture forms a reconstructed prediction error block or picture;

wherein encoding the block or picture comprises predicting the block or picture to form a prediction block or picture; and use the neural net for enhancing the reconstructed prediction error block or picture prior to reconstructing the block or picture with summing up the respective prediction block or picture and the respective prediction error block or picture.

11. The apparatus according to claim 10, wherein the apparatus is further caused to:

reconstruct the block or picture or the respective prediction error block or picture; and fine-tune the neural net with the training signal based on the reconstructed block or picture or the respective reconstructed prediction error block or picture and on the coarse version.

12. The apparatus according to claim 10, wherein the block or picture is determined to be used for on-line learning based on the at least one of the following:

a quantization parameter value;

a block or picture type;

a block or picture prediction type; or a sub-layer identifier associated with the block or picture.

13. The apparatus according to claim 10, wherein the block or picture is determined to be enhanced using the neural net when the block or picture is not used for on-line learning.

14. The apparatus according to claim 10, wherein the apparatus is further caused to:
   indicate, in or along the bitstream, or decode, from or along the bitstream, which blocks or pictures are used as sources for on-line learning.

15. The apparatus according to claim 10, wherein to reconstruct the coarse version, the apparatus is further caused to:
   re-quantize reconstructed transform coefficients of the prediction error block or picture; and
   reconstruct the respective coarse prediction error block or picture.

16. The apparatus according to claim 10, wherein the apparatus is further caused to:
   derive the training signal from a gradient of a loss, where the loss is represented with:
   a difference of a reconstructed prediction error and a neural net enhanced reconstructed prediction error, where the enhancement is applied to a coarser-quantized reconstructed prediction error; or
   a difference of a reconstructed reference block or picture and a neural network enhanced reconstructed reference block or picture, where the enhancement is applied to a coarser-quantized reconstructed prediction error.

17. An apparatus comprising:
   at least one processor; and
   at least one non-transitory memory including computer program code;
   the at least one memory and the computer program code configured to, with the at least one processor, cause the apparatus at least to perform:
   obtain an encoded block of a picture or an encoded picture in a decoder;
   determine when the block or picture is used for on-line learning;
   when affirmative, decode the block or picture;
      reconstruct a coarse version of the block or picture or the respective prediction error block or picture;
      enhance the coarse version using a neural net; and
      fine-tune the neural net with a training signal based at least on the coarse version;
   decode, responsive to the block or picture not being used for on-line learning, the block or picture;
   wherein reconstructing the respective prediction error block or picture forms a reconstructed prediction error block or picture;
   wherein decoding the block or picture comprises predicting the block or picture to form a prediction block or picture; and
   use the neural net for enhancing the reconstructed prediction error block or picture prior to reconstructing the block or picture with summing up the respective prediction block or picture and the respective prediction error block or picture.

18. The apparatus according to claim 17, wherein the apparatus is further caused to:
   reconstruct the block or picture or the respective prediction error block or picture; and
   fine-tune the neural net with the training signal based on the reconstructed block or picture or the respective reconstructed prediction error block or picture and on the coarse version.

19. The apparatus according to claim 17, wherein the block or picture is determined to be used for on-line learning based on the at least one of the following:
   a quantization parameter value;
   a block or picture type;
   a block or picture prediction type; or
   a sub-layer identifier associated with the block or picture.

20. The apparatus according to claim 17, wherein the block or picture is determined to be enhanced using the neural net when the block or picture is not used for on-line learning.

21. The apparatus according to claim 17, wherein the apparatus is further caused to:
   indicate, in or along the bitstream, or decode, from or along the bitstream, which blocks or pictures are used as sources for on-line learning.

22. The apparatus according to claim 17, wherein to perform the reconstructing of the coarse version, the apparatus is further caused to:
   re-quantize reconstructed transform coefficients of the prediction error block or picture; and
   reconstruct the respective coarse prediction error block or picture.

23. The apparatus according to claim 17, wherein the apparatus is further caused to derive the training signal from a gradient of a loss, where the loss is represented with:
   a difference of a reconstructed prediction error and a neural net enhanced reconstructed prediction error, where the enhancement is applied to a coarser-quantized reconstructed prediction error; or
   a difference of a reconstructed reference block or picture and a neural network enhanced reconstructed reference block or picture, where the enhancement is applied to a coarser-quantized reconstructed prediction error.

24. A non-transitory program storage device readable by a machine, tangibly embodying a program of instructions executable with the machine for performing operations, the operations comprising:
   obtaining a block of a picture or a picture in an encoder;
   determining when the block or picture is used for on-line learning;
   when affirmative, encoding the block or picture;
      reconstructing a coarse version of the block or picture or a respective prediction error block or picture;
      enhancing the coarse version using a neural net; and
      fine-tuning the neural net with a training signal based at least on the coarse version;
   encoding, responsive to the block or picture not being used for on-line learning, the block or picture;
   wherein reconstructing the respective prediction error block or picture forms a reconstructed prediction error block or picture;
   wherein encoding the block or picture comprises predicting the block or picture to form a prediction block or picture; and
   using the neural net for enhancing the reconstructed prediction error block or picture prior to reconstructing the block or picture with summing up the respective prediction block or picture and the respective prediction error block or picture.

25. The non-transitory program storage device according to claim 24, the operations comprising deriving the training signal based at least on a gradient of a loss, where the loss is represented with:
   a difference of a reconstructed prediction error and a neural net enhanced reconstructed prediction error, where the enhancement is applied to a coarser-quantized reconstructed prediction error; or a difference of a reconstructed reference block or picture and a neural network enhanced reconstructed reference block or picture, where the enhancement is applied to a coarser-quantized reconstructed prediction error.

26. A non-transitory program storage device readable by a machine, tangibly embodying a program of instructions executable with the machine for performing operations, the operations comprising:

obtaining an encoded block of a picture or an encoded picture in a decoder;

determining when the block or picture is used for on-line learning;

when affirmative, decoding the block or picture;

reconstructing a coarse version of the block or picture or a respective prediction error block or picture;

enhancing the coarse version using a neural net; and fine-tuning the neural net with a training signal based at least on the coarse version;

decoding, responsive to the block or picture not being used for on-line learning, the block or picture;

wherein reconstructing the respective prediction error block or picture forms a reconstructed prediction error block or picture;

wherein decoding the block or picture comprises predicting the block or picture to form a prediction block or picture; and using the neural net for enhancing the reconstructed prediction error block or picture prior to reconstructing the block or picture with summing up the respective prediction block or picture and the respective prediction error block or picture.

27. The non-transitory program storage device according to claim 26, the operations comprising deriving the training signal based at least on a gradient of a loss, where the loss is represented with:

a difference of a reconstructed prediction error and a neural net enhanced reconstructed prediction error, where the enhancement is applied to a coarser-quantized reconstructed prediction error; or a difference of a reconstructed reference block or picture and a neural network enhanced reconstructed reference block or picture, where the enhancement is applied to a coarser-quantized reconstructed prediction error.

* * * * *